(12) United States Patent
Okada

(10) Patent No.: US 8,601,879 B2
(45) Date of Patent: Dec. 10, 2013

(54) CAPACITANCE TYPE PRESSURE SENSOR AND METHOD FOR MANUFACTURING A CAPACITANCE TYPE PRESSURE SENSOR

(75) Inventor: Mizuho Okada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 178 days.

(21) Appl. No.: 13/359,448

(22) Filed: Jan. 26, 2012

(65) Prior Publication Data
US 2012/0186354 A1 Jul. 26, 2012

(30) Foreign Application Priority Data

Jan. 26, 2011 (JP) .................................. 2011-13886

(51) Int. Cl.
*G01L 9/12* (2006.01)
*H01L 21/00* (2006.01)

(52) U.S. Cl.
USPC .................. 73/724; 73/718; 438/53; 257/417

(58) Field of Classification Search
USPC .................................................. 73/700–756
See application file for complete search history.

(56) References Cited

U.S. PATENT DOCUMENTS

| 6,495,389 | B2* | 12/2002 | Ishio et al. | 438/53 |
| 6,877,383 | B2* | 4/2005 | Horie et al. | 73/754 |
| 2013/0062713 | A1* | 3/2013 | Sakuragi et al. | 257/419 |
| 2013/0193534 | A1* | 8/2013 | Nakatani | 257/417 |

FOREIGN PATENT DOCUMENTS

JP 2850558 10/1992

\* cited by examiner

*Primary Examiner* — Andre Allen
(74) *Attorney, Agent, or Firm* — Rabin & Berdo, P.C.

(57) ABSTRACT

A capacitance type pressure sensor includes a semiconductor substrate having a reference pressure compartment formed therein, a diaphragm formed of a portion of the semiconductor substrate and formed in a surface layer portion of the semiconductor substrate to define the reference pressure compartment, the diaphragm having a through-hole communicating with the reference pressure compartment, fillers arranged within the through-hole, and an isolation insulating layer surrounding the diaphragm to isolate the diaphragm from the remaining portion of the semiconductor substrate.

10 Claims, 18 Drawing Sheets

CAPACITANCE TYPE PRESSURE SENSOR AND METHOD FOR MANUFACTURING A CAPACITANCE TYPE PRESSURE SENSOR

CROSS-REFERENCE TO RELATED APPLICATION

This application is based upon and claims the benefit of priority from Japan Patent Application No. 2011-13886, filed on Jan. 26, 2011, the entire contents of which are incorporated herein by reference.

TECHNICAL FIELD

The present disclosure relates to a capacitance type pressure sensor and a method for manufacturing a capacitance type pressure sensor.

BACKGROUND

Pressure sensors manufactured using MEMS (micro-electro-mechanical systems) technology are used as, e.g., pressure sensors or pressure switches in industrial machines. These pressure sensors include a diaphragm, as a pressure receiving portion, which is formed by, e.g., partially thinning a substrate. The pressure sensors detect stress or displacement generated when the diaphragm is deformed under pressure.

One example of a pressure sensor is a pressure sensor formed by bonding two substrates together. In order to manufacture the pressure sensor disclosed in a related art, a LOCOS oxide film is first formed on the surface of a first substrate to surround a predetermined region. A second substrate is bonded to the surface of the LOCOS oxide film. In the predetermined region, therefore, a space is formed between the first and second substrates. Then, the opposite surface of the first substrate from the surface formed with the LOCOS oxide film is cut and abraded until the LOCOS oxide film becomes exposed. As a result, the residual portion of the first substrate surrounded by the LOCOS oxide film becomes a diaphragm.

A capacitance type pressure sensor is obtained by forming electrodes in the first substrate (the diaphragm portion) and the second substrate (the portion facing toward the diaphragm portion).

In the prior art set forth above, the manufacturing cost grows higher because two substrates are needed to manufacture one pressure sensor. Since the pressure sensor has a thickness close to the thickness of the two substrates, the volume of the pressure sensor as a whole becomes greater. Moreover, the need to use two substrates in manufacturing one pressure sensor leads to an increase in the number of steps for manufacturing the pressure sensor. Particularly, in order to manufacture a capacitance type pressure sensor through the use of two substrates, it is necessary to form electrodes in the first substrate having a diaphragm and a second substrate having a portion opposing to the diaphragm across a space.

SUMMARY

The present disclosure provides some embodiments of a capacitance type pressure sensor capable of realizing cost-effectiveness and size reduction.

The present disclosure provides some embodiments of a method for manufacturing a capacitance type pressure sensor, which is capable of easily manufacturing a cheap and small capacitance type pressure sensor.

According to one aspect of the present disclosure, there is provided a capacitance type pressure sensor, including a semiconductor substrate, a diaphragm, fillers and an isolation insulating layer. The semiconductor substrate has a reference pressure compartment formed therein. The diaphragm is formed of a portion of the semiconductor substrate and formed in a surface layer portion of the semiconductor substrate to define the reference pressure compartment. The diaphragm has a through-hole communicating with the reference pressure compartment. The fillers are arranged within the through-hole. The isolation insulating layer surrounds the diaphragm to isolate the diaphragm from the remaining portion of the semiconductor substrate.

With this configuration, the reference pressure compartment (space) is formed within a single semiconductor substrate and the diaphragm is formed of a portion of the semiconductor substrate. For that reason, there is no need to form the reference pressure compartment and the diaphragm by bonding two semiconductor substrates together. This makes it possible to reduce the cost. Since a capacitance type pressure sensor is formed of a single semiconductor substrate, it is possible to reduce the size of the capacitance type pressure sensor as compared with when a capacitance type pressure sensor is formed by bonding two semiconductor substrates together.

The through hole is arranged in the diaphragm defining the reference pressure compartment and formed to communicate with the reference pressure compartment. As the through-hole is closed by the fillers, it is possible to hermetically seal the reference pressure compartment. Therefore, if the pressure within the reference pressure compartment is set as a reference pressure, it is possible to detect the pressure acting on the diaphragm as a relative pressure with respect to the reference pressure. More specifically, the diaphragm is deformed depending on the difference between the pressure acting at the side of the diaphragm facing the reference pressure compartment and the pressure acting at the opposite side of the diaphragm from the reference pressure compartment. Thus, the distance between the diaphragm and the bottom surface of the reference pressure compartment is changed. As a result, the capacitance between the diaphragm and the bottom surface of the reference pressure compartment is changed. The pressure acting on the diaphragm can be detected by detecting the capacitance.

The isolation insulating layer surrounds the diaphragm to isolate the diaphragm from the remaining portion of the semiconductor substrate. Thus, the diaphragm and the remaining portion of the semiconductor substrate are insulated from each other. Accordingly, a capacitor structure can be formed by the diaphragm and the portion of the semiconductor substrate defining the bottom surface of the reference pressure compartment. Since the diaphragm is defined by the isolation insulating layer, it is possible to accurately form the diaphragm having desired dimensions. This makes it possible to reduce variations in the sensitivity of the capacitance type pressure sensor.

The capacitance type pressure sensor may in some embodiments include a first wiring line connected to the diaphragm and a second wiring line connected to a portion of the semiconductor substrate insulated from the diaphragm by the isolation insulating layer. This makes it possible to provide a capacitance type pressure sensor having a simple configuration in which the diaphragm and the remaining portion of one semiconductor substrate are used as electrodes.

The isolation insulating layer may extend into the semiconductor substrate to a position shallower than a bottom surface of the reference pressure compartment and may define a region narrower than the reference pressure compartment. In other words, the reference pressure compartment may be formed over a region broader than the isolation insulating layer. Thus, the peripheral region outside the isolation insulating layer (namely, the outer region of the isolation insulating layer opposite from the diaphragm) becomes an outer peripheral film portion having a thickness substantially equal to the thickness of the diaphragm. Accordingly, there is provided a movable film including the diaphragm, the isolation insulating layer and the outer peripheral film portion. If a pressure difference is generated between the opposite surfaces of the diaphragm, the entire movable film is deformed. Since the diaphragm is positioned in the central region of the movable film, the displacement of the diaphragm becomes greater. Thus, the response of the diaphragm to a minute pressure change may be improved. It is therefore possible to enhance the sensitivity of the capacitance type pressure sensor.

The capacitance type pressure sensor may further include an integrated circuit portion having integrated circuit devices formed in the semiconductor substrate. This makes it possible to form a capacitance type pressure sensor and an integrated circuit portion in one semiconductor substrate.

According to another aspect of the present disclosure, there is provided a method for manufacturing a capacitance type pressure sensor, including: forming a ring-shaped trench in a semiconductor substrate to surround a region on a surface of the semiconductor substrate; filling an isolation insulating layer into the ring-shaped trench; forming a hole in the region of the semiconductor substrate; introducing an etching agent into the hole and etching a substrate material existing below the hole to thereby form a reference pressure compartment below the hole and a diaphragm above the reference pressure compartment; and arranging fillers within the hole.

The pressure sensor of the configuration stated above is obtained by this method. With this method, if the substrate material existing below the hole is etched in the etching step by introducing the etching agent into the hole, the reference pressure compartment is formed in the semiconductor substrate below the hole. The hole is arranged in the predetermined region, which is surrounded by the isolation insulating layer of the ring shaped trench in the semiconductor substrate. On the other hand, the diaphragm is formed above the reference pressure compartment. At this time, the isolation insulating layer surrounds the diaphragm so that the diaphragm can be defined by the isolation insulating layer. It is therefore possible to accurately form the diaphragm with a desired dimension. This makes it possible to easily manufacture a capacitance type pressure sensor with increased sensitivity and reduced variation in sensitivity. Since the isolation insulating layer isolates the diaphragm from the remaining portion of the semiconductor substrate, the diaphragm and the remaining portion are insulated from each other. Accordingly, a capacitor structure can be formed by the diaphragm and the portion of the semiconductor substrate, which defines the bottom surface of the reference pressure compartment.

With this method, the reference pressure compartment and the diaphragm can be formed through a reduced number of steps using only one semiconductor substrate without having to bond two semiconductor substrates together. It is therefore possible to easily manufacture a cheap and small capacitance type pressure sensor. By arranging the fillers within the hole, it is possible to hermetically seal the reference pressure compartment positioned below the hole. Using the pressure within the reference pressure compartment as a reference pressure, the capacitance type pressure sensor can detect the pressure acting on the diaphragm as a relative pressure with respect to the reference pressure. More specifically, the diaphragm is deformed depending on the difference between the pressure acting at the side of the diaphragm facing the reference pressure compartment and the pressure acting on the opposite side of the diaphragm from the reference pressure compartment. Thus, the distance between the diaphragm and the bottom surface of the reference pressure compartment changes. As a result, the capacitance between the diaphragm and the bottom surface of the reference pressure compartment changes. The pressure acting on the diaphragm can be detected by detecting the capacitance.

The trench forming step may include forming the ring-shaped trench into a depth shallower than a portion of the semiconductor substrate which is to become a bottom surface of the reference pressure compartment. The etching step may include isotropically etching the substrate material existing below the hole such that the reference pressure compartment is formed below the ring-shaped trench to extend over a region broader than the ring-shaped trench. In this case, if the capacitance type pressure sensor is finally manufactured, the isolation insulating layer filled in the ring-shaped trench extends into the semiconductor substrate to a position shallower than the bottom surface of the reference pressure compartment and defines a region narrower than the reference pressure compartment. In other words, the reference pressure compartment is formed over a region broader than the isolation insulating layer. As a result, the outer peripheral film portion is formed in the peripheral region outside the isolation insulating layer. Thus, a movable film is formed including the diaphragm, the isolation insulating layer and the outer peripheral film portion. The movable film is larger than the diaphragm and is provided with the diaphragm in the central region thereof. Accordingly, the displacement of the diaphragm defined by the isolation insulating layer becomes greater. In proportion thereto, the response of the diaphragm to a minute pressure change becomes faster. It is therefore possible to enhance the sensitivity of the capacitance type pressure sensor.

The method of the present invention may include a step of connecting a first wiring line to the diaphragm and a step of connecting a second wiring line to a portion of the semiconductor substrate insulated from the diaphragm by the isolation insulating layer. This makes it possible to easily manufacture a capacitance type pressure sensor of simple configuration in which the diaphragm and the remaining portion of one semiconductor substrate are used as electrodes.

The etching step may include forming a sidewall insulating layer on a sidewall of the hole and isotropically etching the substrate material by introducing the etching agent into the hole. Since the sidewall insulating layer is formed on the sidewall of the hole in advance, it is possible to prevent the etching agent introduced into the hole from etching the sidewall of the hole (the diaphragm portion).

The method of the present invention may include a step of forming integrated circuit devices in a region of the semiconductor substrate other than a region in which the reference pressure compartment is formed. This makes it possible to form a capacitance type pressure sensor and an integrated circuit portion in one substrate. At least some of the manufacturing steps may be shared in forming the capacitance type pressure sensor and the integrated circuit portion. For example, a contact hole forming step and a wiring step may be simultaneously performed to form a capacitance type pressure sensor and integrated circuit portion.

DETAILED DESCRIPTION

Figure 1:
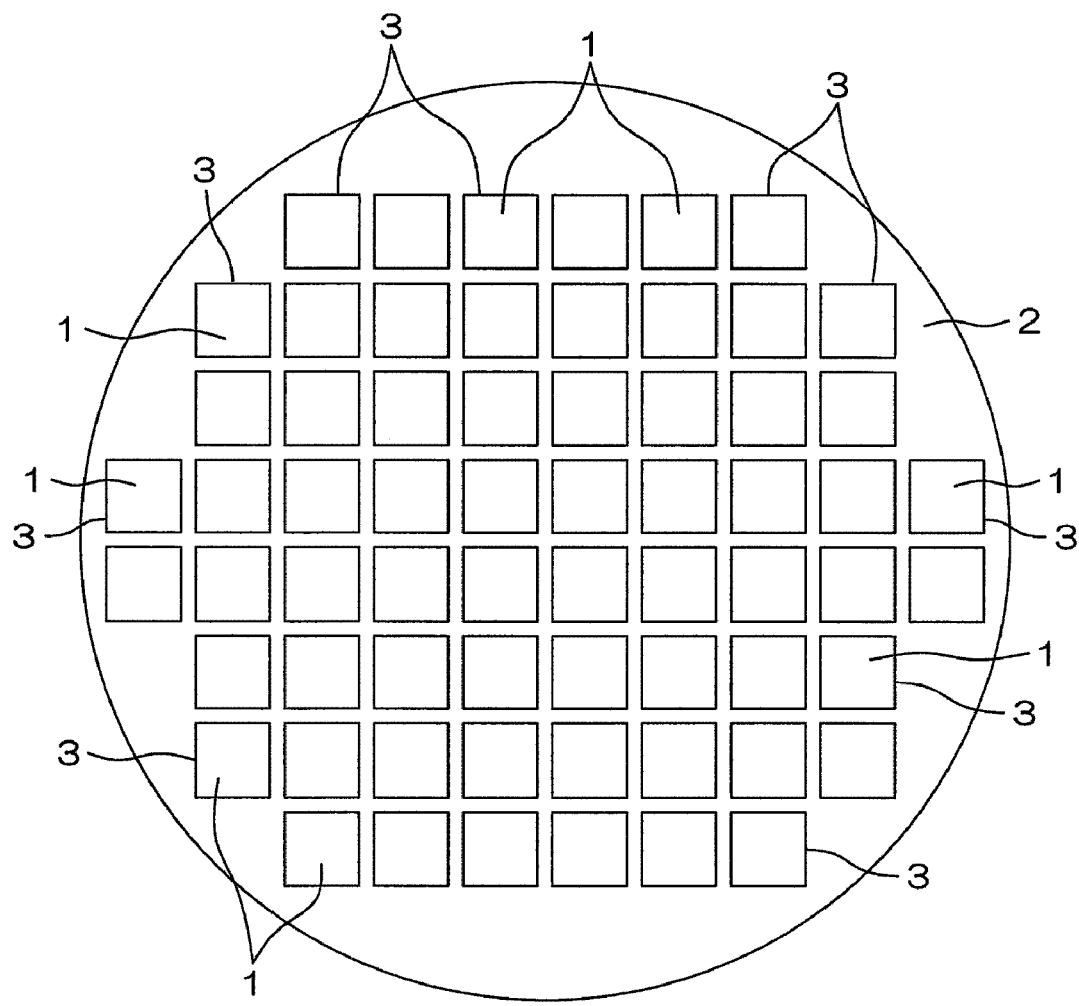
FIG. 1 is a schematic plane view showing a silicon substrate used in a manufacturing process of a pressure sensor according to one embodiment of the present invention.

One embodiment of the present disclosure will now be described in detail with reference to the accompanying drawings. FIG. 1 is a schematic plane view showing a silicon substrate used in a manufacturing process of a pressure sensor according to one embodiment of the present invention. A plurality of pressure sensors 1 is collectively formed on a single low-resistance silicon substrate 2 (or a semiconductor substrate). The pressure sensors 1 are respectively formed in a plurality of rectangular regions 3 arranged at regular intervals on the silicon substrate 2. In the example shown in FIG. 1, the respective rectangular regions 3 are substantially of a square shape in a plane view and are arranged in a matrix shape to be spaced apart from one another. The shape of the rectangular regions 3 is not limited thereto and may be, e.g., a substantially rectangular shape. The low-resistance silicon substrate 2 is specifically formed of silicon which is subjected to crystal growth while adding P-type or N-type impurities. The silicon substrate 2 may have a specific resistance of, e.g., 5 to 25 mΩ·cm.

Figure 2:
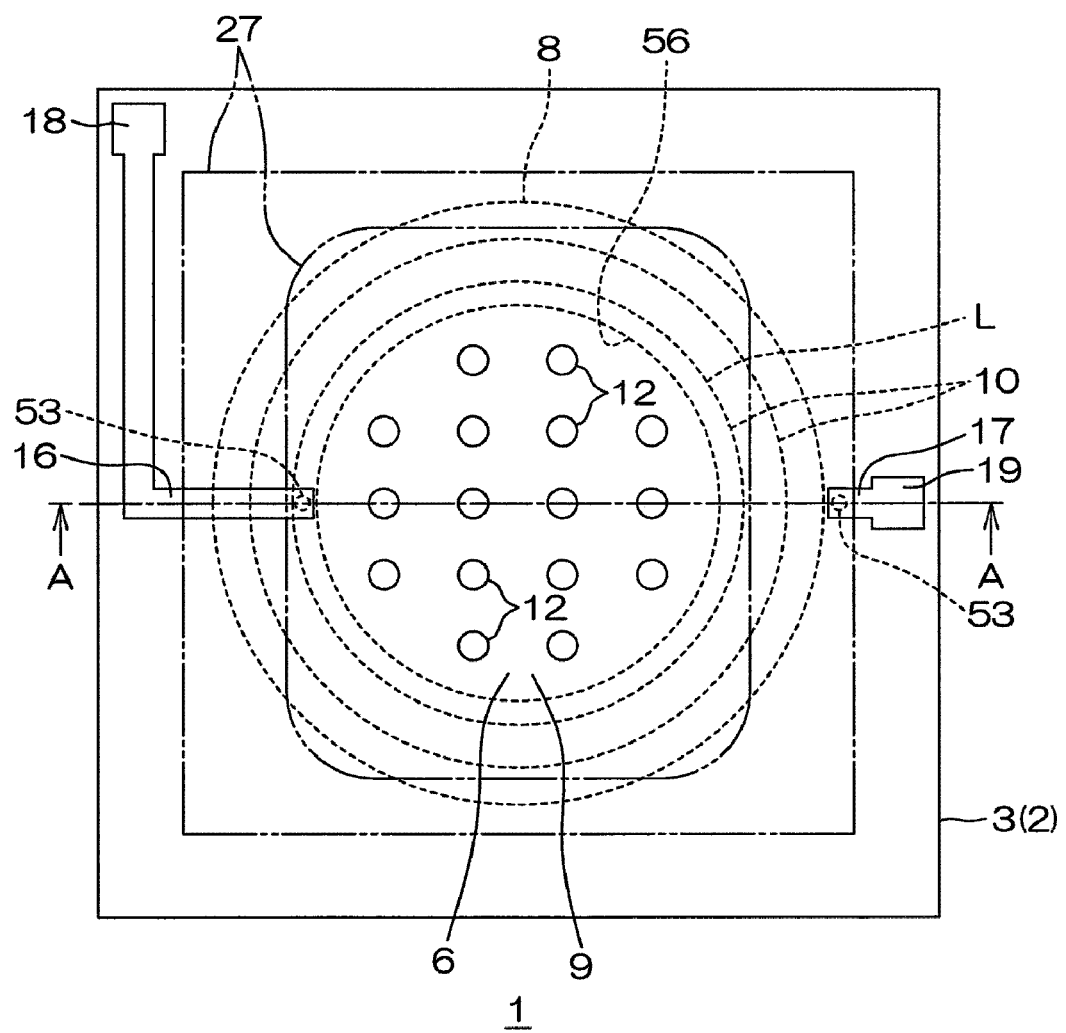
FIG. 2 is an enlarged plane view showing a pressure sensor.
Figure 3A:
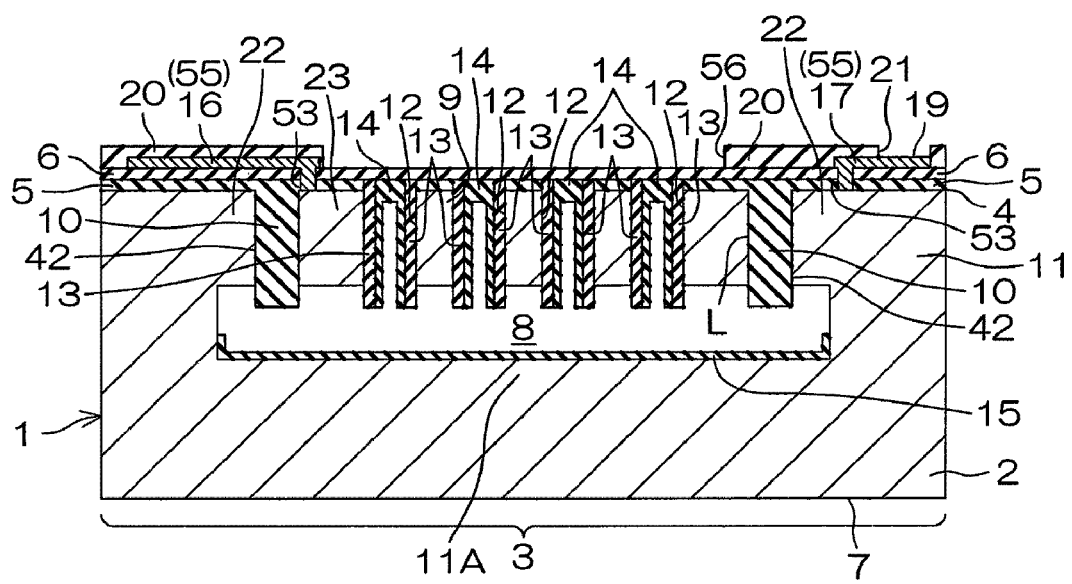
FIG. 3A is a section view taken along line A-A in FIG. 2.
Figure 3B:
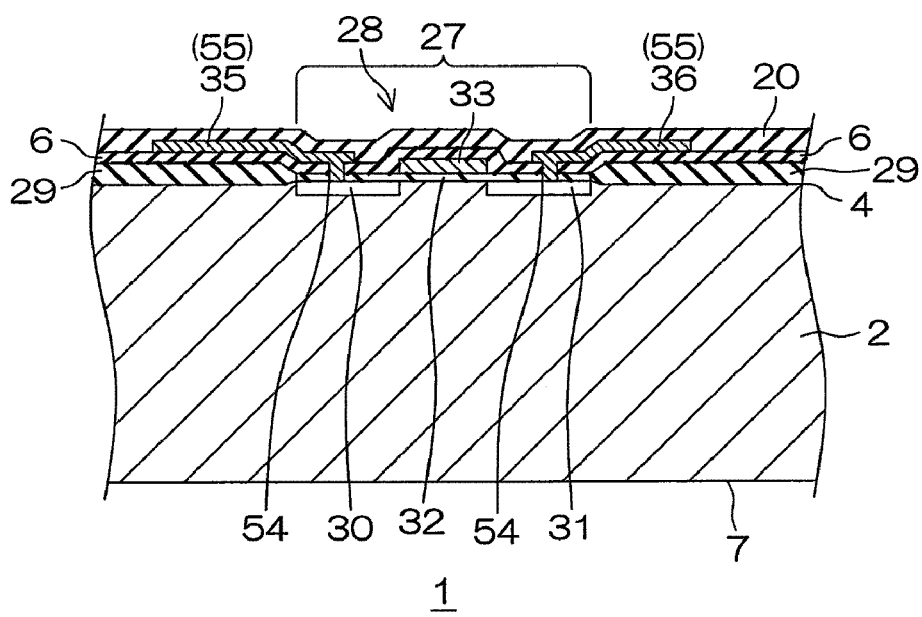
FIG. 3B is a section view showing certain major portions of the pressure sensor in an integrated circuit region shown in FIG. 2.

FIG. 2 is an enlarged plane view showing one of the pressure sensors. FIG. 3A is a section view taken along line A-A in FIG. 2, and FIG. 3B is a section view showing certain major portions of each of the pressure sensors in an integrated circuit region shown in FIG. 2. As shown in FIG. 3A, each of the pressure sensors 1 includes a silicon substrate 2 having a size corresponding to each of the rectangular regions 3. The silicon substrate 2 has a front surface 4 covered with a covering layer 5. An insulating layer 6 is formed on the surface of the covering layer 5. The covering layer 5 and the insulating layer 6 are made of, e.g., silicon oxide ($SiO_2$). The silicon substrate 2 has a rear surface 7 as an exposed surface.

A reference pressure compartment 8 is formed within the silicon substrate 2. In the present embodiment, the reference pressure compartment 8 is a flat cavity (flat space) extending parallel to the front surface 4 and the rear surface 7 of the silicon substrate 2 and having a reduced height in the vertical direction (the thickness direction of the silicon substrate 2). In other words, the dimension of the reference pressure compartment 8 in the direction parallel to the front surface 4 and the rear surface 7 is greater than the dimension thereof in the vertical height direction. The reference pressure compartment 8 is formed in each of the pressure sensors 1 in a one-to-one correspondence. In the present embodiment, the reference pressure compartment 8 is formed into a circular shape when seen in a plane view (a cylindrical shape when seen in a three-dimensional view).

Due to the formation of the reference pressure compartment 8 within the silicon substrate 2, the portion at the side of the front surface 4 of the of silicon substrate 2 opposite the reference pressure compartment 8 is thinner than the remaining portion. Thus, the silicon substrate 2 includes a diaphragm 9 having a circular plan-view shape positioned at the side of the front surface 4 with respect to the reference pressure compartment 8. The diaphragm 9 is a thin film capable of being displaced perpendicular to the reference pressure compartment 8 (in the thickness direction of the silicon substrate 2). The diaphragm 9 is a portion of the silicon substrate 2 and is formed in the surface layer portion of the silicon substrate 2 to define the reference pressure compartment 8 at the upper side thereof The diameter of the diaphragm 9 is smaller than the diameter of the reference pressure compartment 8 and is 500 to 600 μm in the present embodiment. The thickness of the diaphragm 9 is, e.g., 0.5 to 1.5 μm. In FIG. 3A, the thickness of the diaphragm 9 is illustrated on an exaggerated scale to clearly show the structure thereof. The diaphragm 9 is united with and supported by other portion (called "remaining portion 11") of the silicon substrate 2. In the present embodiment, the diaphragm 9 is arranged substantially at the center of each of the rectangular regions 3 when seen in a plane view (see FIG. 2).

An isolation insulating layer 10 surrounding the circumference of the diaphragm 9 is formed in the silicon substrate 2. The isolation insulating layer 10 is an annular vertical wall defining the diaphragm 9 when seen in a plane view. The inner circumferential edge of the isolation insulating layer 10 coincides with the contour L of the diaphragm 9 (see FIG. 2). The isolation insulating layer 10 continuously extends from covering layer 5 formed on the front surface 4 of the silicon substrate 2 and extends into the silicon substrate 2 to reach a position lower than the bottom surface of the reference pressure compartment 8 (i.e., a position shifted a little downward from the top surface of the reference pressure compartment 8). The isolation insulating layer 10 defines a region narrower than the reference pressure compartment 8 in the direction orthogonal to the thickness direction of the silicon substrate 2. In other words, the reference pressure compartment 8 is formed over a region wider than the isolation insulating layer 10. Thus, the peripheral region outside the isolation insulating layer 10 (namely, the outer region of the isolation insulating layer 10 is located opposite the diaphragm 9) becomes an outer peripheral film portion 22 having a thickness substantially equal to the thickness of the diaphragm 9. Accordingly, there is provided a movable film 23 including the diaphragm 9, the isolation insulating layer 10 and the outer peripheral film portion 22. The movable film 23 is a thin film having a thickness substantially equal to the thickness of the diaphragm 9. The movable film 23 as a whole is displaceable in the direction perpendicular to the reference pressure compartment 8. Since the diaphragm 9 is positioned in the central region of the movable film 23, the displacement of the diaphragm 9 is greatest among the displacement of the movable film 23.

The reference pressure compartment 8 exists below the diaphragm 9 in the thickness direction of the silicon substrate 2. The isolation insulating layer 10 exists outside the diaphragm 9 in the direction orthogonal to the thickness direction of the silicon substrate 2. Thus, the diaphragm 9 is insulated and isolated from the other portion (the remaining portion 11) of the silicon substrate 2. A plurality of through-holes 12 having a circular plan-view shape is formed in the diaphragm 9 over the entire region inside the contour L of the diaphragm 9 (namely, inside the inner circumferential edge of the isolation insulating layer 10) at a regular intervals (see FIG. 2). In the present embodiment, the through-holes 12 are regularly arranged when seen in a plane view. All the through-holes 12 penetrate through the portion of the front surface 4 of the silicon substrate 2 existing between the covering layer 5 and the reference pressure compartment 8 (the portion of the front surface 4 of the silicon substrate 2 including the covering layer 5) and communicate with the reference pressure compartment 8. In the present embodiment, the diameter of each of the through-holes 12 is, e.g., 0.5 to 1 µm, and the depth of each of the through-holes 12 is, e.g., 3 to 5 µm.

The inner wall surfaces of the through-holes 12 are covered with a protective thin film 13 (a sidewall insulating layer) made of silicon oxide ($SiO_2$). In all the through-holes 12, the inside of the protective thin film 13 is filled with and plugged by an oxide film made of silicon oxide ($SiO_2$) and formed by a CVD (Chemical Vapor Deposition) method. Thus, all the through-holes 12 are closed by oxide-film fillers 14 (plugging materials). The reference pressure compartment 8 positioned below the through-holes 12 is sealed to serve as a reference pressure room whose internal pressure becomes a reference pressure during pressure detection. In the present embodiment, the reference pressure compartment 8 is kept in a depressurized state (e.g., about 1 Ton). The oxide films filled in the through-holes 12 become the fillers 14 for closing the respective through-holes 12 in the upper portions of the through-holes 12. A covering film 15 as an oxide film covers the bottom portion of the inner wall of the reference pressure compartment 8 as shown in FIG. 3A.

A first metal wiring line 16 (or a first wiring line) is connected to the diaphragm 9 of each of the pressure sensors 1. A second metal wiring line 17 (or a second wiring line) is connected to the remaining portion 11 of the silicon substrate 2 insulated and isolated from the diaphragm 9 by the isolation insulating layer 10. In the present embodiment, the first metal wiring line 16 and the second metal wiring line 17 are made of aluminum (Al) and are provided on the insulating layer 6. The first metal wiring line 16 is connected to the diaphragm 9 through the insulating layer 6 and the covering layer 5. The second metal wiring line 17 is connected to the remaining portion 11 through the insulating layer 6 and the covering layer 5.

As shown in FIG. 2, a first metal terminal 18 is connected to the first metal wiring line 16 and a second metal terminal 19 is connected to the second metal wiring line 17. In the present embodiment, the first metal terminal 18 and the second metal terminal 19 are made of aluminum (Al) and are formed on the insulating layer 6 (see FIG. 3A). The first metal terminal 18 is arranged in one of the four corners of each of the rectangular regions 3 when seen in a plane view. The second metal terminal 19 is arranged substantially in the longitudinal center position of one side of each of the rectangular regions 3.

The first metal wiring line 16 linearly extends along the radial direction of the diaphragm 9. Then, the first metal wiring line 16 is bent substantially at a right angle in and around the outer peripheral edge of each of the rectangular regions 3. Then, the first metal wiring line 16 linearly extends along the outer peripheral edge of each of the rectangular regions 3. The first metal wiring line 16 is connected to the first metal terminal 18. The second metal wiring line 17 linearly extends along the radial direction of the diaphragm 9. The second metal wiring line 17 is connected to the second metal terminal 19. As shown in FIG. 3A, the first metal wiring line 16, the second metal wiring line 17, the first metal terminal 18 and the second metal terminal 19 are covered with a passivation film 20 made of silicon nitride (SiN). The first metal terminal 18 does not appear in the cross section shown in FIG. 3A. The passivation film 20 has openings 21 through which the first metal terminal 18 and the second metal terminal 19 are exposed in the form of pads. The passivation film 20 is not shown in FIG. 2.

In each of the pressure sensors 1, there is provided a capacitor structure (or a capacitor) in which the diaphragm 9 becomes a movable electrode and in which the section of the remaining portion 11 opposite the diaphragm 9 from below across the reference pressure compartment 8 becomes a fixed electrode 11A. A bias voltage is applied to the first metal terminal 18 and the second metal terminal 19. The electric potential difference between the movable electrode (the diaphragm 9) and the fixed electrode 11A is kept constant. In this regard, if the diaphragm 9 receives pressure (e.g., a gas pressure) from the side of the front surface 4 of the silicon substrate 2, a differential pressure is generated between the inside and outside of the reference pressure compartment 8 (between the opposite surfaces of the diaphragm 9). Thus, the entire movable film 23 including the diaphragm 9 is displaced in the thickness direction of the silicon substrate 2. At this time, the diaphragm 9 existing in the central region of the movable film 23 is most largely displaced (flexed). In response, the spacing between the diaphragm 9 and the fixed electrode 11A (the depth of the reference pressure compartment 8) is changed and the capacitance between the diaphragm 9 and the fixed electrode 11A is also changed. Based on the change in the capacitance, it is possible to detect the magnitude of the pressure generated in each of the pressure sensors 1. In other words, the pressure sensors 1 are capacitance type pressure sensors.

Referring to FIG. 2, an integrated circuit region 27 (a region surrounded by double-dot chain lines) is provided between the outer peripheral edge of each of the rectangular regions 3 of the silicon substrate 2 (more specifically, the portion of the first metal wiring line 16 linearly extending along the outer peripheral edge of each of the rectangular regions 3) and the diaphragm 9. The integrated circuit region 27 is a substantially rectangular ring-shaped region surrounding the diaphragm 9 when seen in a plane view. An integrated circuit portion 28 as shown in FIG. 3B including transistors, resistors and other integrated circuit devices (functional elements) is formed in the integrated circuit region 27. That is to say, each of the pressure sensors 1 includes the integrated circuit portion 28 formed on the silicon substrate 2 having the diaphragm 9 and the like.

More specifically, as shown in FIG. 3B, the integrated circuit region 27 is insulated and isolated from other regions of the silicon substrate 2 by means of a LOCOS layer 29. A source 30 and a drain 31 are formed in the surface layer portion of the silicon substrate 2 of the integrated circuit region 27. A gate oxide film 32 straddling the source 30 and the drain 31 is formed in the portion of the front surface 4 of the silicon substrate 2 corresponding to the integrated circuit region 27. A gate electrode 33 is formed on the gate oxide film 32 to be opposite the portion existing between the source 30 and the drain 31 (namely, the portion where a channel is formed). The insulating layer 6 is formed on the LOCOS layer 29 and the gate oxide film 32 to cover the gate electrode 33.

A source-side metal wiring line 35 and a drain-side metal wiring line 36 are provided on the surface of the insulating layer 6. The source-side metal wiring line 35 is connected to the source 30 through the insulating layer 6 and the gate oxide film 32. The drain-side metal wiring line 36 is connected to the drain 31 through the insulating layer 6 and the gate oxide film 32. The passivation film 20 is formed on the surface of the insulating layer 6 to cover the source-side metal wiring line 35 and the drain-side metal wiring line 36. In the subject specification, a group of components arranged in the integrated circuit region 27 will be referred to as "integrated circuit portion 28".

Figure 4A:
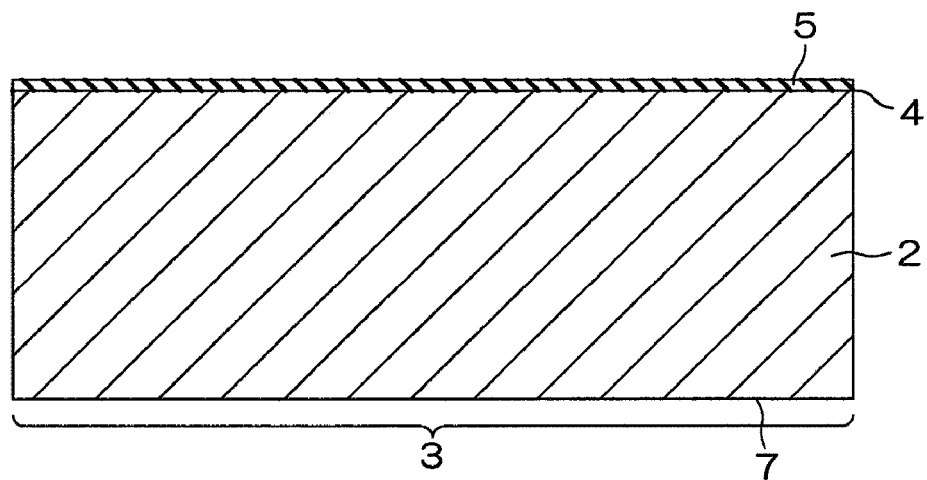
FIG. 4A is a section view schematically showing a manufacturing step of the pressure sensor shown in FIGS. 2 and 3, in which a cross section view is taken in the same position as in FIG. 3A.
Figure 4B:
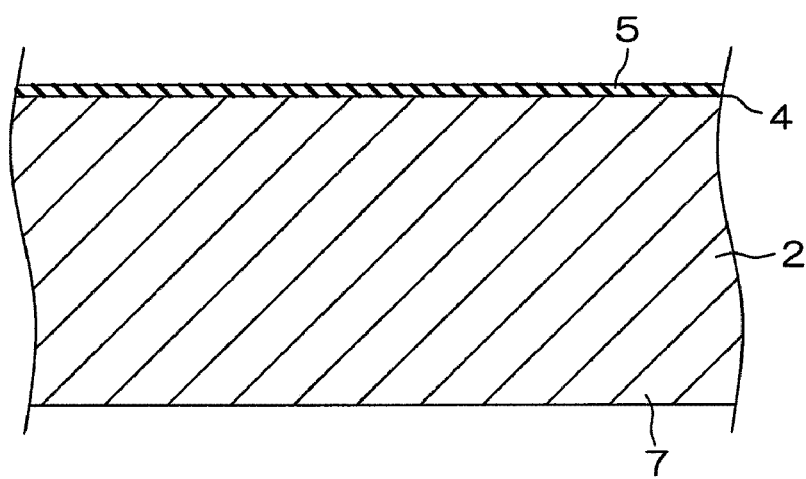
FIG. 4B shows the cross section taken in the same position as in FIG. 3B at the same point in time as the step shown in FIG. 4A.

FIGS. 4A through 18B illustrate a process for manufacturing the pressure sensor 1 shown in FIGS. 2 and 3. Two section views are illustrated in some of FIGS. 4A through 18B, in which case the upper section view shows the cross section taken in the same position as in FIG. 3A and the lower section view shows the cross section taken in the same position as in FIG. 3B. In order to manufacture the pressure sensor 1, a silicon substrate 2 (or a wafer) is prepared as shown in FIGS. 4A and 4B. In the present embodiment, the thickness of the silicon substrate 2 at this point in time is about 300 µm. More specifically, a silicon substrate 2 having a diameter of 6 inches and a thickness of about 625 µm or a silicon substrate 2 having a diameter of 8 inches and a thickness of about 725 µm is selected and made thin to have a thickness of 300 µm, which state is shown in FIGS. 4A and 4B.

Figure 5A:
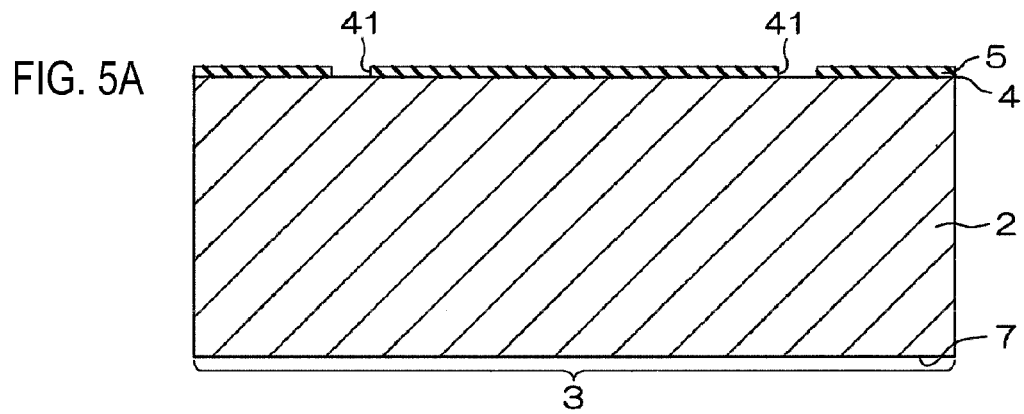
FIG. 5A is a section view schematically showing the next step of the step shown in FIG. 4A.
Figure 5B:
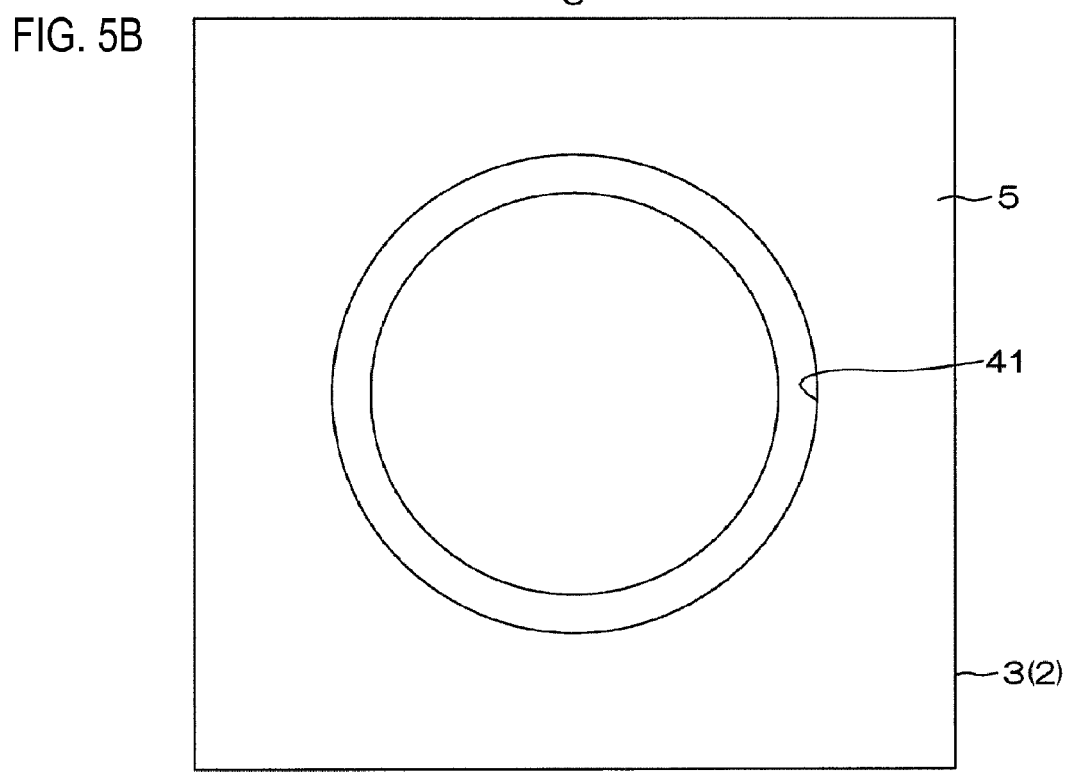
FIG. 5B is a plane view showing the same state as shown in FIG. 5A, and 5C shows a cross section taken in the same position as in FIG. 3B at the same point in time as the step shown in FIG. 5A.
Figure 5C:
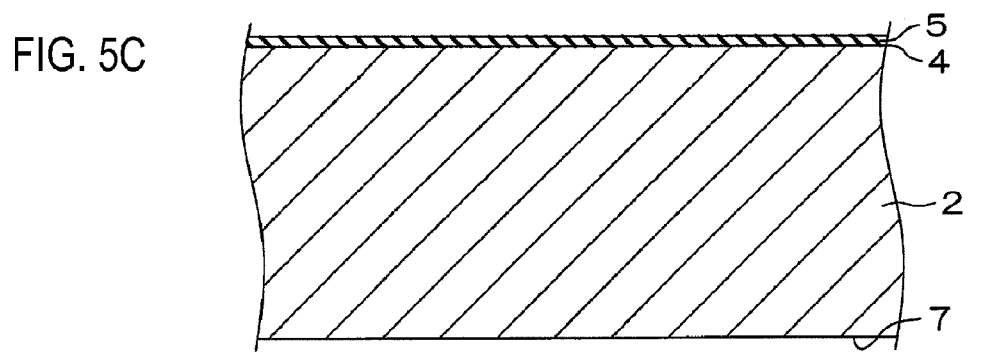

Next, a covering layer 5 made of silicon oxide ($SiO_2$) is formed on the front surface 4 of the silicon substrate 2 by a thermal oxidation method or a CVD method. A resist pattern not shown in the drawings is formed on the covering layer 5 by photolithography. The resist pattern has an annular opening corresponding in shape to the isolation insulating layer 10 (FIGS. 2 and 3A). Next, the covering layer 5 is selectively etched through plasma etching in which the resist pattern (not shown) is used as a mask. FIGS. 5A through 5C show a state when the plasma etching has ended. In this state, an annular opening 41 is formed in the covering layer 5.

Figure 6A:
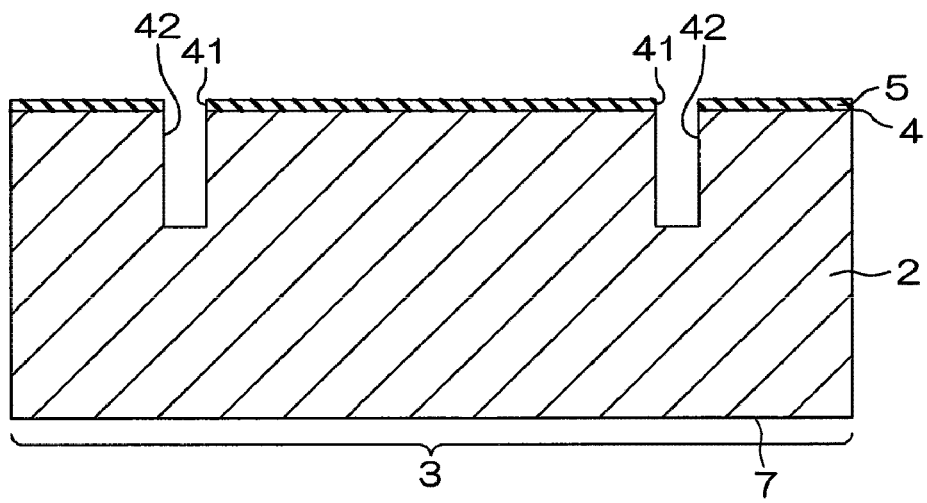
FIG. 6A is a section view schematically showing the next step of the step shown in FIG. 6B.
Figure 6B:
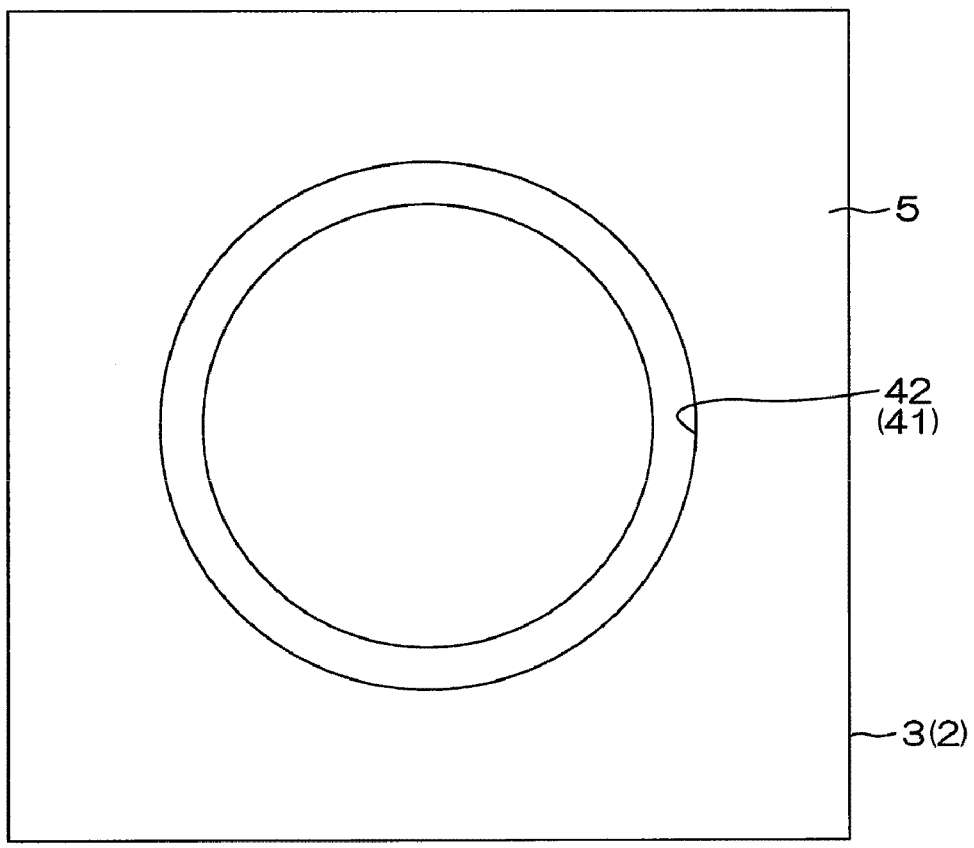
FIG. 6B is a plane view showing the same state as shown in FIG. 6A.

Next, the silicon substrate 2 is dug down by anisotropic deep reactive ion etching in which the covering layer 5 is used as a mask. Thus, a ring-shaped trench 42 is formed as shown in FIGS. 6A and 6B. The ring-shaped trench 42 is an annular vertical groove. The ring-shaped trench 42 is formed to surround a predetermined region on the front surface 4 of the silicon substrate 2 in which through-holes 12 (FIGS. 2 and 3A) are to be formed. In addition, the ring-shaped trench 42 is formed to a depth shallower than the portion of the silicon substrate 2 which is to become the bottom surface of the reference pressure compartment 8 (see FIG. 3A).

Figure 7:
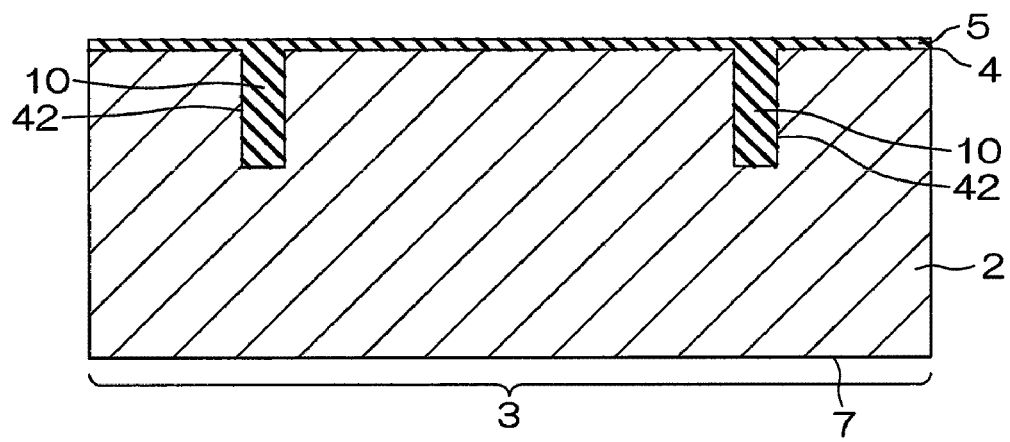
FIG. 7 is a section view schematically showing the next step of the step shown in FIG. 6A.

Next, as shown in FIG. 7, the ring-shaped trench 42 is filled with an oxide film through a CVD method. The oxide film existing within the ring-shaped trench 42 serves as the isolation insulating layer 10 set forth above. In other words, the isolation insulating layer 10 is filled into the ring-shaped trench 42 in the present step. At this time, the oxide film may protrude from the ring-shaped trench 42, thereby making the surface of the covering layer 5 irregular. The surface of the covering layer 5 is flattened using a resist etchback method.

Figure 8A:
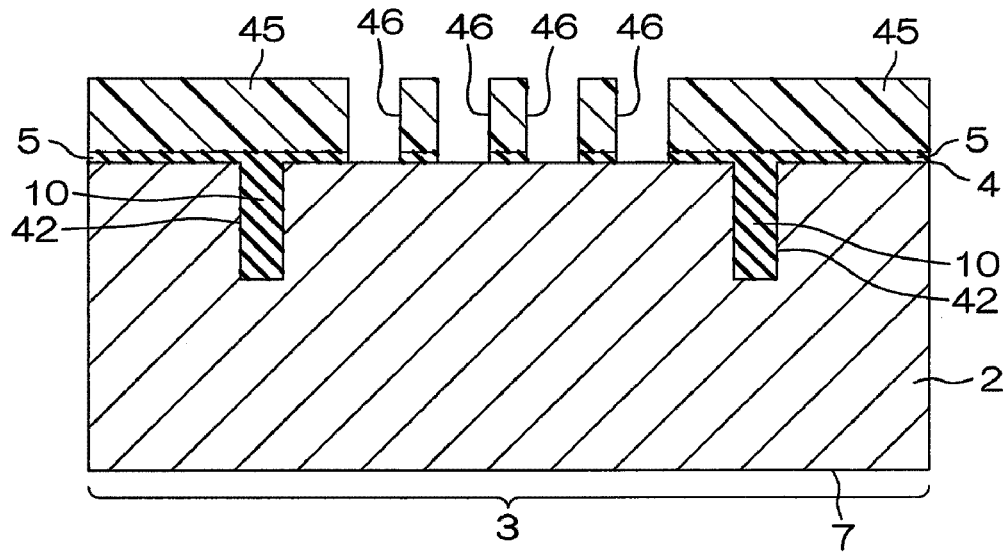
FIG. 8A is a section view schematically showing the next step of the step shown in FIG. 7.

Next, as shown in FIG. 8A, a resist pattern 45 is formed on the covering layer 5 using photolithography. The resist pattern 45 has a plurality of openings 46 corresponding to the plurality of through-holes 12 (FIGS. 2 and 3A). If the through-holes 12 are formed to have a circular cross section, the openings 46 are also formed into a circular shape. Just like the through-holes 12, the diameter of each of the openings 46 is about 0.5 to 1 µm. When seen in a plane view, all the openings 46 are formed inside the ring-shaped trench 42 (the isolation insulating layer 10) (see FIG. 8B).

Figure 8B:
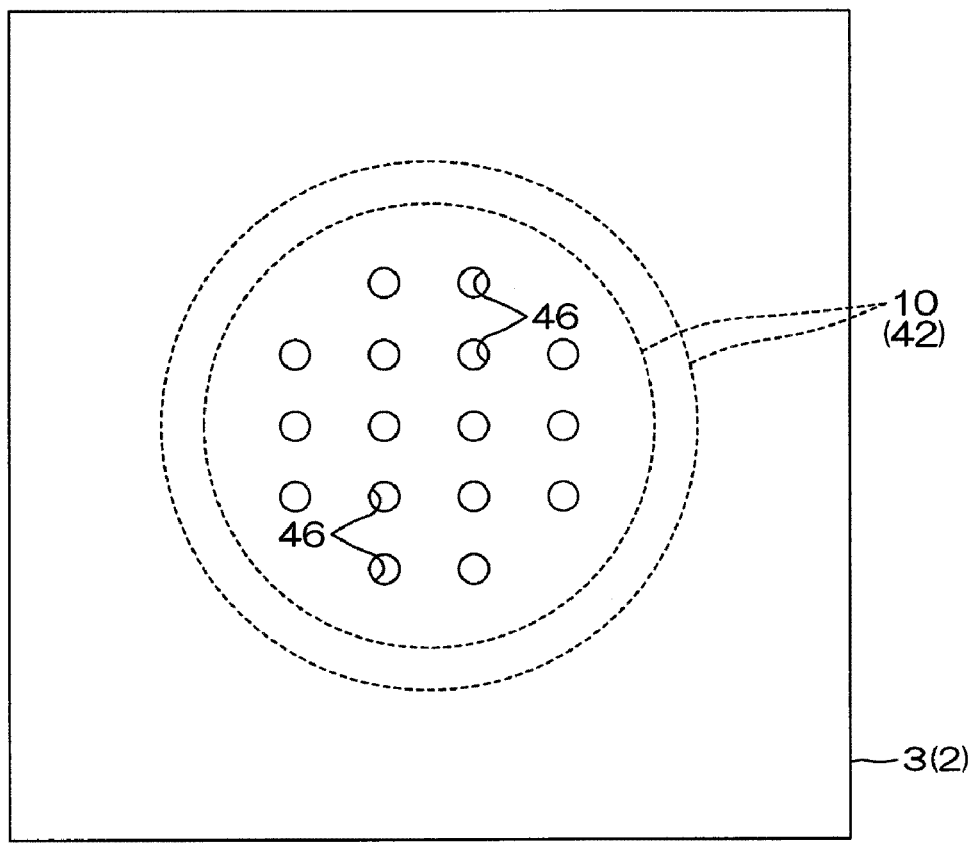
FIG. 8B is a plane view showing the same state as shown in FIG. 8A.

Next, the covering layer 5 is selectively removed by plasma etching in which the resist pattern 45 is used as a mask. Consequently, openings corresponding to the through-holes 12 are formed in the covering layer 5. FIGS. 8A and 8B show a state when the plasma etching has ended. Next, the silicon substrate 2 is dug down by anisotropic deep reactive ion etching in which the resist pattern 45 is used as a mask.

Figure 9A:
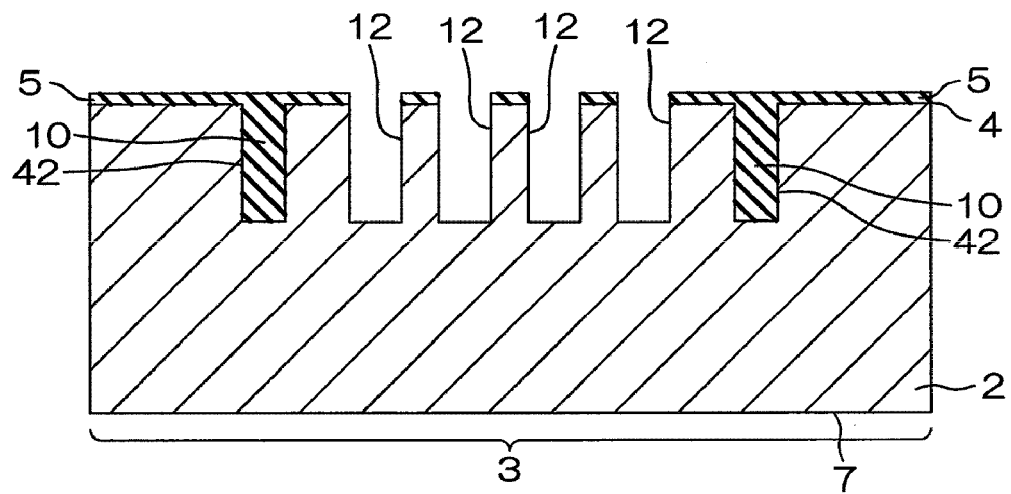
FIG. 9A is a section view schematically showing the next step of the step shown in FIG. 8A.
Figure 9B:
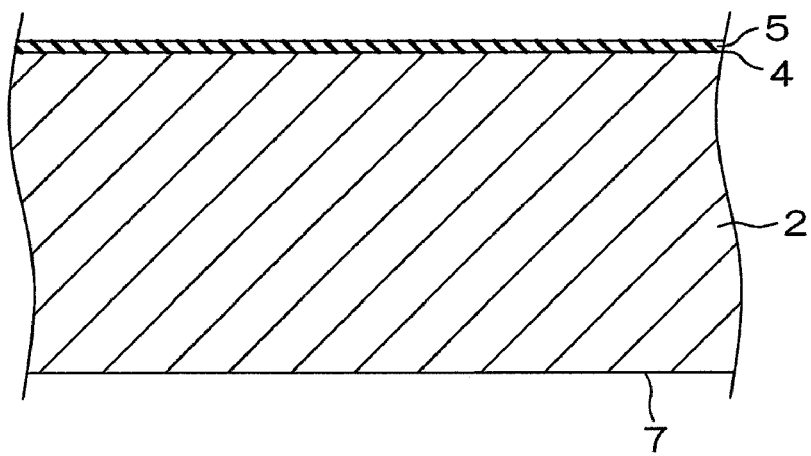
FIG. 9B shows a cross section taken in the same position as in FIG. 3B at the same point in time as the step shown in FIG. 9A.

Accordingly, as shown in FIG. 9A, the through-holes 12 are formed in the positions on the silicon substrate 2 corresponding to the respective openings 46 of the resist pattern 45 (namely, the selectively removed portions of the covering layer 5). If the openings 46 are of a circular shape, the through-holes 12 are formed to have a cylindrical concave shape extending downward to a depth from the covering layer 5 of the front surface 4 of the silicon substrate 2. The bottom surfaces of the respective through-holes 12 are arranged substantially at the same depth position as the bottom surface of the ring-shaped trench 42 (the isolation insulating layer 10). The through-holes 12 are formed in a region surrounded by the ring-shaped trench 42 (the isolation insulating layer 10). When forming the through-holes 12, the resist pattern 45 is simultaneously etched into a thin film. After forming the through-holes 12, the remaining portion of the resist pattern 45 is peeled off.

In this regard, the deep-digging reactive ion etching for the formation of the through-holes 12 may be performed using a so-called Bosch process. In the Bosch process, a step of etching the silicon substrate 2 using $SF_6$ (sulfur hexafluoride) and a step of forming a protective film on the etched surface using C₄F₈ (perfluorocyclobutane) are alternately repeated. This makes it possible to etch the silicon substrate 2 with an increased aspect ratio.

Figure 10A:
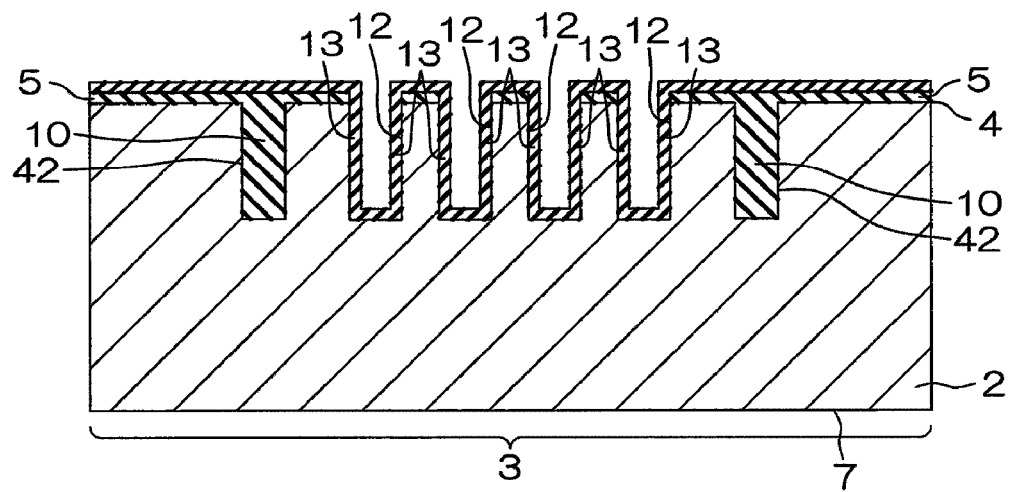
FIG. 10A is a section view schematically showing the next step of the step shown in FIG. 9A.
Figure 10B:
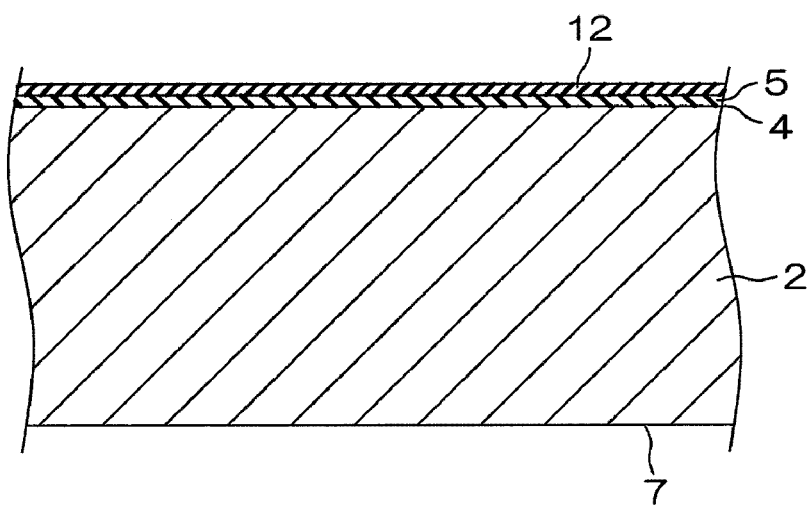
FIG. 10B shows a cross section taken in the same position as in FIG. 3B at the same point in time as the step shown in FIG. 10A.

Next, as shown in FIG. 10A, in the silicon substrate 2, a protective thin film 13 made of silicon oxide (SiO$_2$) is formed on the entire region of the inner surface defining the respective through-holes 12 (namely, the circumferential surfaces and the bottom surfaces of the through-holes 12) and on the surface of the covering layer 5 by a thermal oxidation method or a CVD method. The thickness of the protective thin film 13 in the sidewalls of the through-holes 12 is about 1000 to 2000 Å. At this point in time, the protective thin film 13 existing within the respective through-holes 12 has a tubular shape (more specifically, a cylindrical shape) covering the sidewalls of the through-holes 12 and includes bottom surface portions formed at the lower ends of the through-holes 12.

Figure 11A:
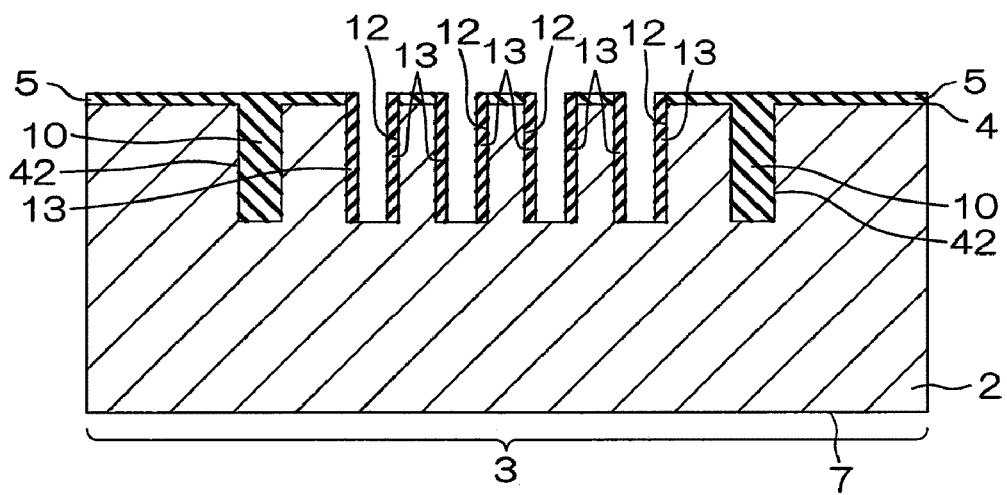
FIG. 11A is a section view schematically showing the next step of the step shown in FIG. 10A.
Figure 11B:
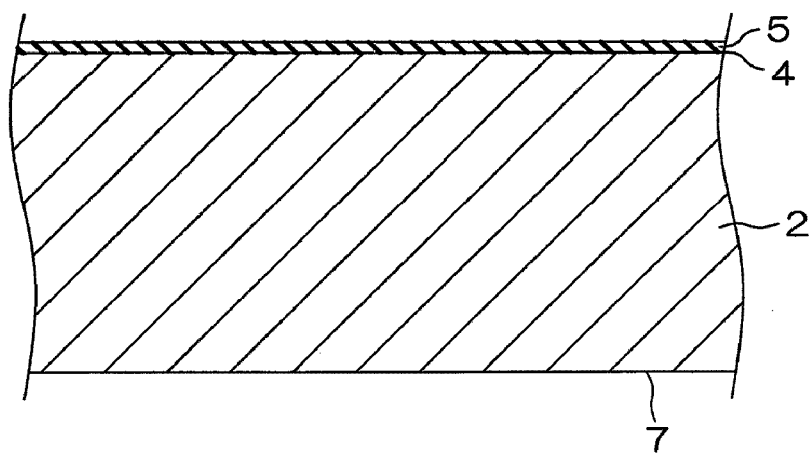
FIG. 11B shows a cross section taken in the same position as in FIG. 3B at the same point in time as the step shown in FIG. 11A.
Figure 12A:
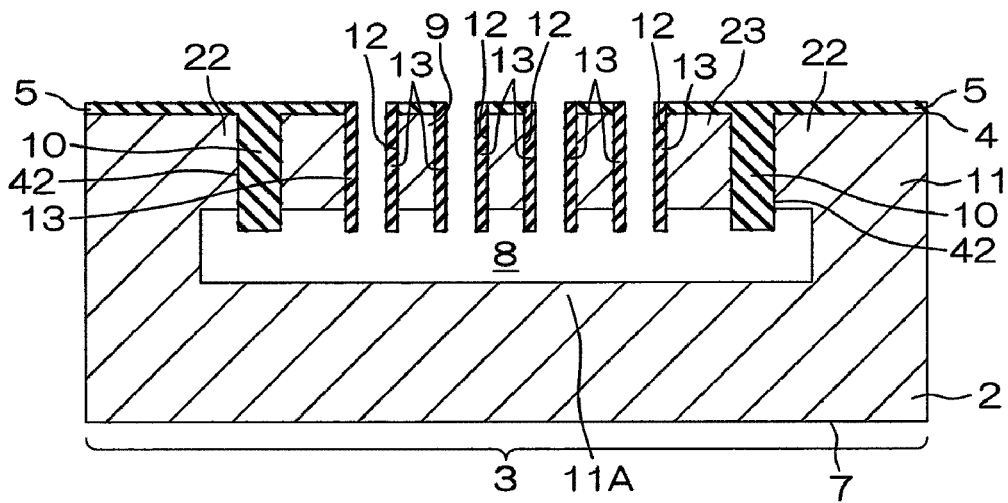
FIG. 12A is a section view schematically showing the next step of the step shown in FIG. 11A.
Figure 12B:
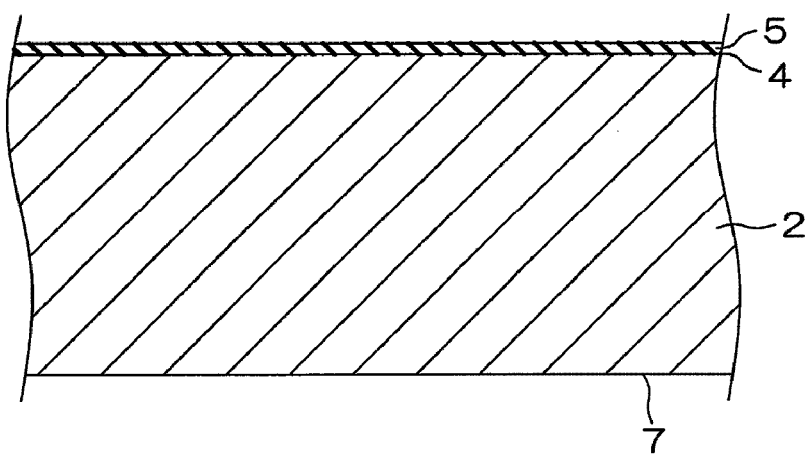
FIG. 12B shows the cross section taken in the same position as in FIG. 3B at the same time point as the step shown in FIG. 12A.

Next, as shown in FIG. 11A, the portions of the protective thin film 13 on the bottom surfaces of the through-holes 12 (namely, the bottom surface portions of the cylindrical protective thin film 13) and the portions of the protective thin film 13 on the surface of the covering layer 5 are removed by reactive ion etching. Consequently, the crystal surfaces of the silicon substrate 2 are exposed from the bottom surfaces of the through-holes 12. Next, as shown in FIG. 12A, an etching agent is introduced into the through-holes 12 from the side of the front surface 4 of the silicon substrate 2 (isotropic etching). When using dry etching, e.g., plasma etching, an etching gas is introduced into the through-holes 12. In addition, when using wet etching, an etching liquid is introduced into the through-holes 12. Thus, the substrate material of the silicon substrate 2 existing below the respective through-holes 12 (more precisely, existing around the bottoms of the respective through-holes 12) is isotropically etched using the protective thin film 13 on the covering layer 5 and the inner surfaces of the through-holes 12 as a mask. More specifically, using the bottoms of the respective through-holes 12 as starting points, the silicon substrate 2 is etched in the thickness direction thereof and in a direction orthogonal to the thickness direction. At the lower side of the ring-shaped trench 42 (the isolation insulating layer 10), the region of the silicon substrate 2 broader than the ring-shaped trench 42 is etched.

As a result of the isotropic etching, a reference pressure compartment 8 (or a flat space) communicating with the respective through-holes 12 is formed within the silicon substrate 2 and below the respective through-holes 12 (around the bottoms of the respective through-holes 12). At the same time, a diaphragm 9 is formed above the reference pressure compartment 8. More specifically, the reference pressure compartment 8 is formed below the ring-shaped trench 42 (the isolation insulating layer 10) over a region broader than the ring-shaped trench 42. As a consequence, the afore-mentioned outer peripheral film portion 22 is formed. The movable film 23 stated above includes the outer peripheral film portion 22, the isolation insulating layer 10 and the diaphragm 9.

In this regard, the depth of the reference pressure compartment 8 (namely, the thickness direction dimension of the silicon substrate 2) can be adjusted depending on the introduction amount of an etching liquid. It is also possible to adjust the depth of the reference pressure compartment 8 depending on the spacing between the mutually adjoining through-holes 12. In this case, if the spacing between the through-holes 12 is narrow, the reference pressure compartment 8 is formed within a relatively shorter period of etching time by joining the adjacent through-holes 12 to extend the space. Accordingly, the height of the reference pressure compartment 8 becomes relatively small. On the other hand, if the spacing between the through-holes 12 is wide, etching needs to be performed for a relatively longer period of time to extend the space by joining the adjacent through-holes 12. Thus, the height of the reference pressure compartment 8 becomes larger.

By adjusting the depth of the reference pressure compartment 8 in this manner, it is possible to control the spacing between the diaphragm 9 (the movable electrode) and the remaining portion 11 (the fixed electrode 11A) and, eventually, to adjust the sensitivity of the pressure sensor 1 (see FIG. 3A). As a result of the isotropic etching, the substrate material existing around the bottoms of the respective through-holes 12 is etched. When the reference pressure compartment 8 is completely formed, the bottom portions of the tubular protective thin film 13 protrude from the diaphragm 9 into the reference pressure compartment 8 and face toward the bottom surface of the reference pressure compartment 8 with a predetermined gap left therebetween. The tubular protective thin film 13 is formed on the inner surfaces of the respective through-holes 12. Likewise, the lower end portion of the isolation insulating layer 10 protrudes from the diaphragm 9 into the reference pressure compartment 8 and faces toward the bottom surface of the reference pressure compartment 8 with a predetermined gap left therebetween. Therefore, the reference pressure compartment 8 does not have a perfectly cylindrical shape. The top surface portion of the reference pressure compartment 8 is recessed inward (downward) in the positions corresponding to the respective through-holes 12 and the isolation insulating layer 10.

Figure 13A:
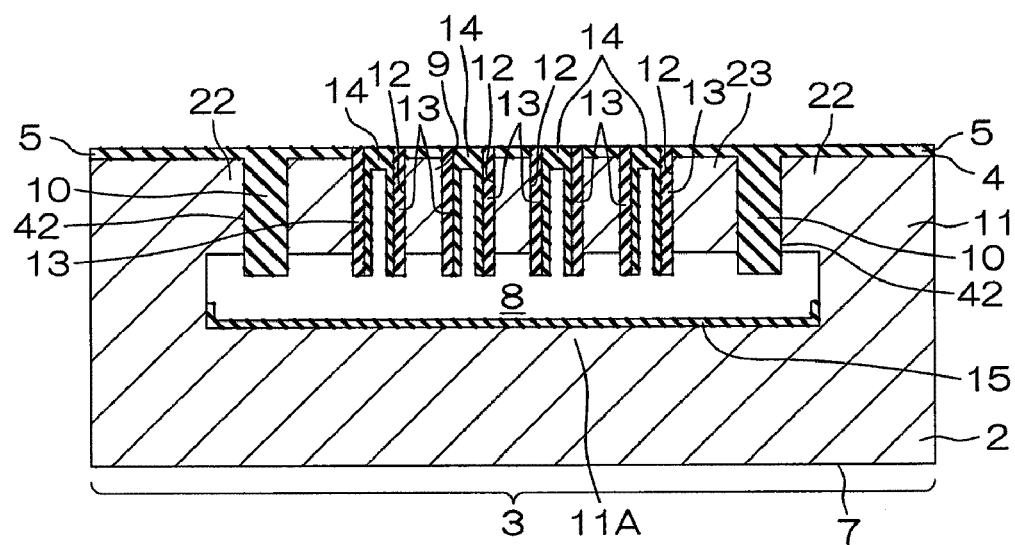
FIG. 13A is a section view schematically showing the next step of the step shown in FIG. 12A.

As shown in FIG. 13A, the respective through-holes 12 are filled with and closed by oxide films through a CVD method. More specifically, oxide films are formed in the inner upper portions of the protective thin film 13 existing on the circumferential surfaces of the through-holes 12 so that the oxide films can close the through-holes 12. The oxide films are the fillers 14 set forth above. In the present step, the fillers 14 are arranged within the respective through-holes 12. By closing the respective through-holes 12, the reference pressure compartment 8 is sealed into a vacuum state. At this time, the oxide films may protrude from the through-holes 12, thereby making the surface of the covering layer 5 irregular. The surface of the covering layer 5 is flattened by a resist etchback method. As the diameter of the through-holes 12 increases, it is likely that larger irregularities are generated on the surface of the covering layer 5.

The oxide films for closing the through-holes 12 are not formed only within the through-holes 12, but also cover the lower portion of the inner wall surface of the reference pressure compartment 8 as the afore-mentioned covering film 15. The oxide films are continuously formed with the fillers 14 to extend from the bottoms of the through-holes 12 into the reference pressure compartment 8. Since the depth of the reference pressure compartment 8 is, e.g., 2 to 3 µm, there is no likelihood that the reference pressure compartment 8 is filled up with the covering film 15. As the diameter of the through-holes 12 becomes smaller, the through-holes 12 are closed faster. Thus, the covering film 15 becomes thinner.

Figure 14A:
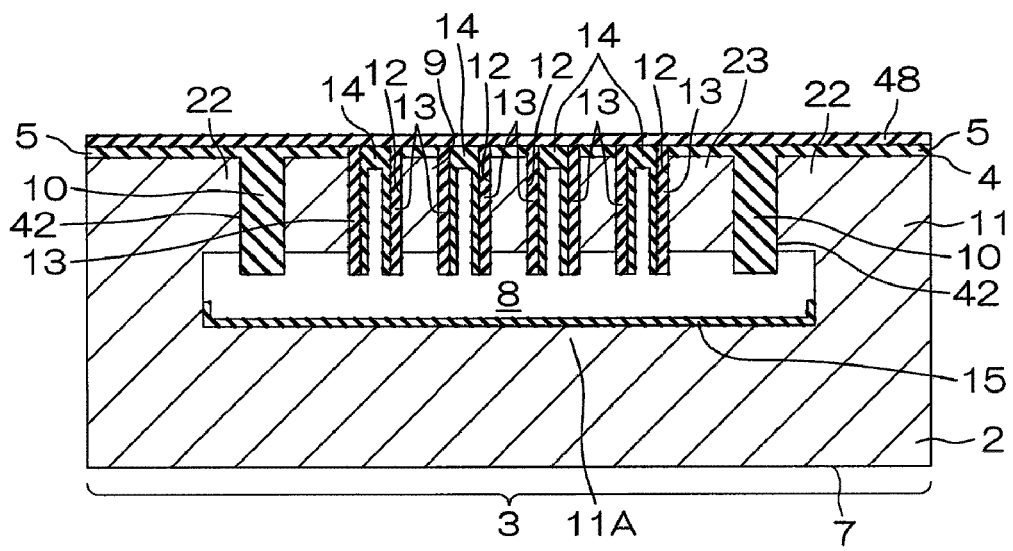
FIG. 14A is a section view schematically showing the next step of the step shown in FIG. 13A.
Figure 14B:
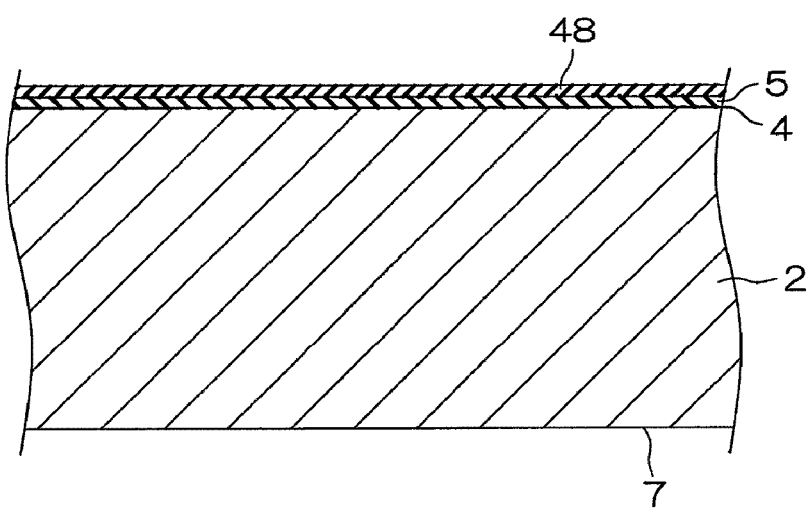
FIG. 14B shows a cross section taken in the same position as in FIG. 3B at the same point in time as the step shown in FIG. 14A.

Next, a step of forming an integrated circuit portion 28 (see FIG. 3B) in an integrated circuit region 27 is carried out. The integrated circuit region 27 refers to the region of the silicon substrate 2 other than the region in which the reference pressure compartment 8 and the diaphragm 9 are formed. First, as shown in FIGS. 14A and 14B, a nitride film 48 made of silicon nitride (SiN) is formed on the surface of the covering layer 5 of the silicon substrate 2.

Figure 15:
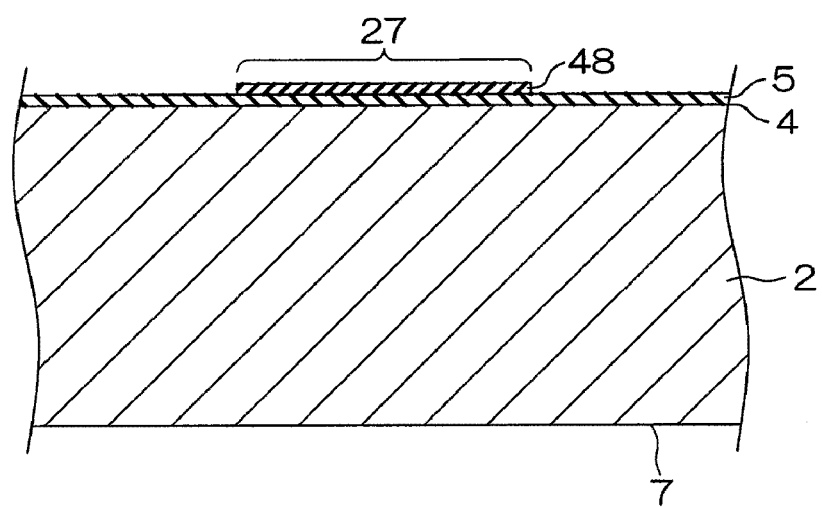
FIG. 15 is a section view schematically showing the next step of the step shown in FIG. 14B.
Figure 16A:
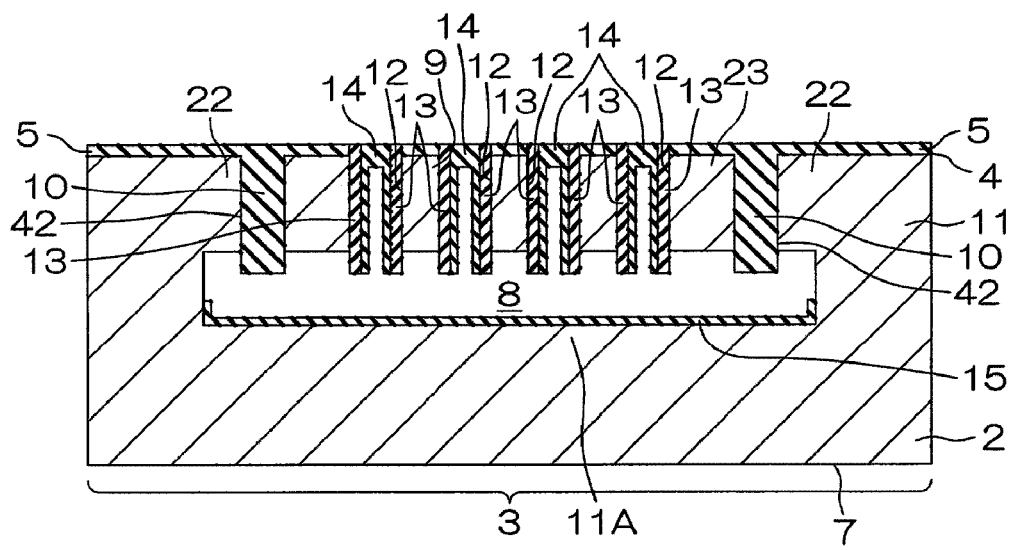
FIG. 16A is a section view showing the next step of the step shown in FIG. 15, in which view the cross section is taken in the same position as in FIG. 3A.
Figure 16B:
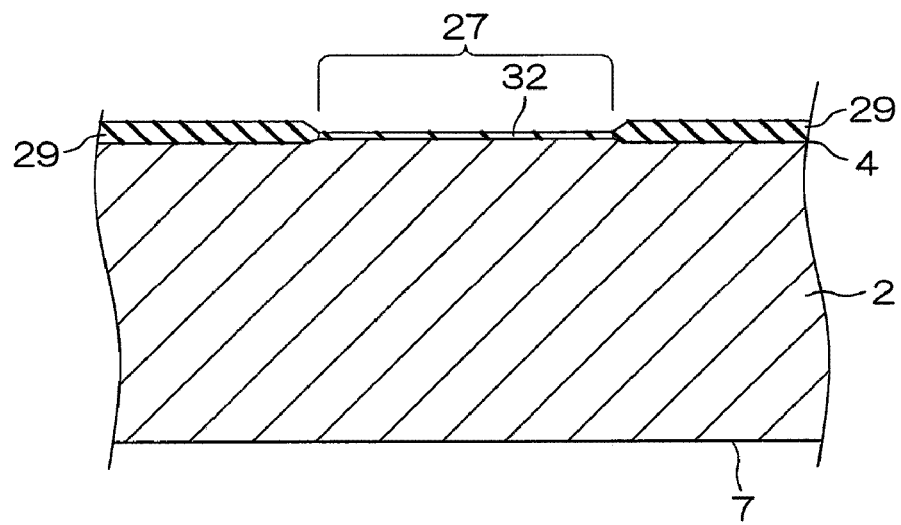
FIG. 16B shows a cross section taken in the same position as in FIG. 3B at the same point in time as the step shown in FIG. 16A.

Next, as shown in FIG. 15, the nitride film 48 is selectively removed by plasma etching through the use of a mask of a predetermined pattern (not shown). As a result, the nitride film 48 is left only in the portion which is to become the integrated circuit region 27. Subsequently, the front surface portion of the silicon substrate 2 around the remaining nitride film 48 is oxidized using the remaining nitride film 48 as a mask, thereby forming a LOCOS layer 29 around the remaining nitride film 48. Thereafter, the remaining nitride film 48 and the covering layer 5 positioned below the nitride film 48 are removed. The afore-mentioned gate oxide film 32 is newly formed by, e.g., a thermal oxidation method. FIG. 16B illustrates a state when the gate oxide film 32 is formed. The region of the silicon substrate 2 in which the gate oxide film 32 is formed (namely, the region isolated by the LOCOS layer 29) becomes the integrated circuit region 27.

Figure 17:
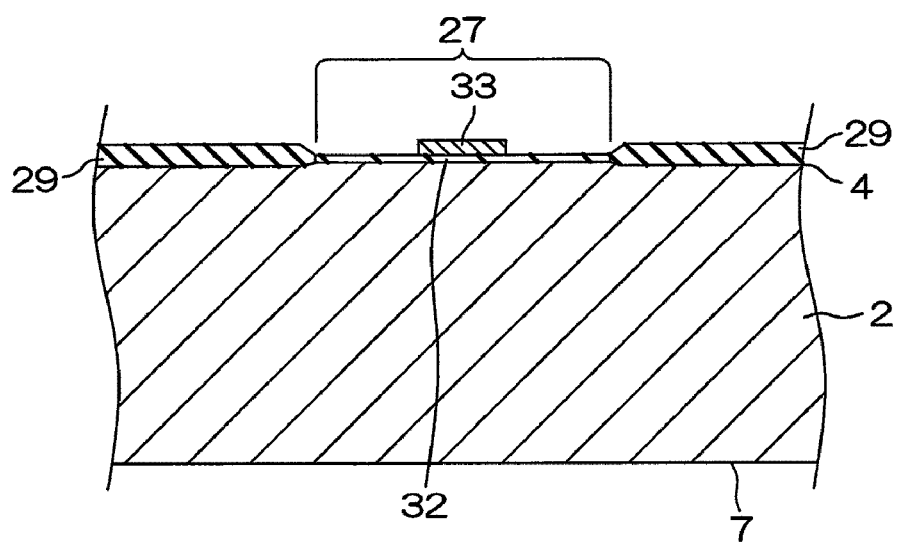
FIG. 17 is a section view schematically showing the next step of the step shown in FIG. 16B.
Figure 18A:
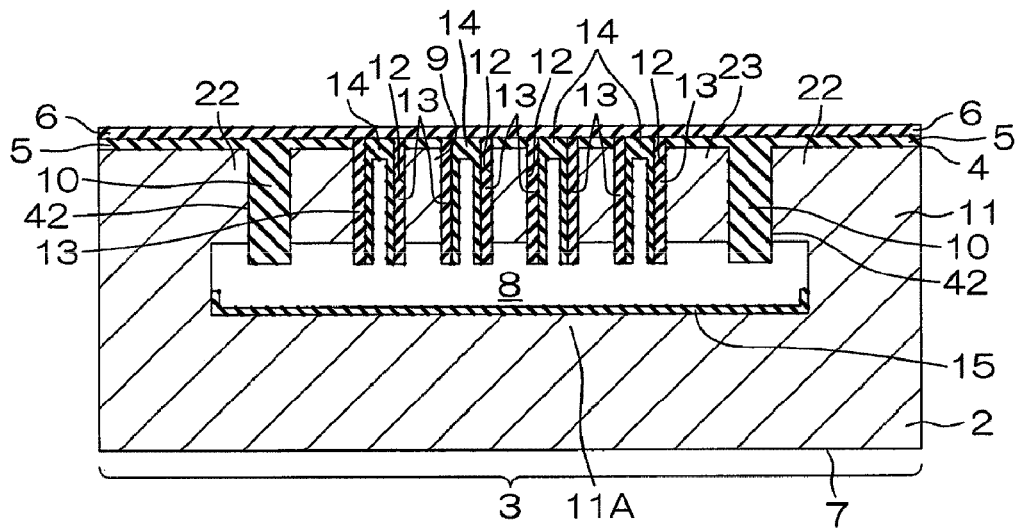
FIG. 18A is a section view showing the next step of the step shown in FIG. 17, in which a cross section view is taken in the same position as in FIG. 3A.
Figure 18B:
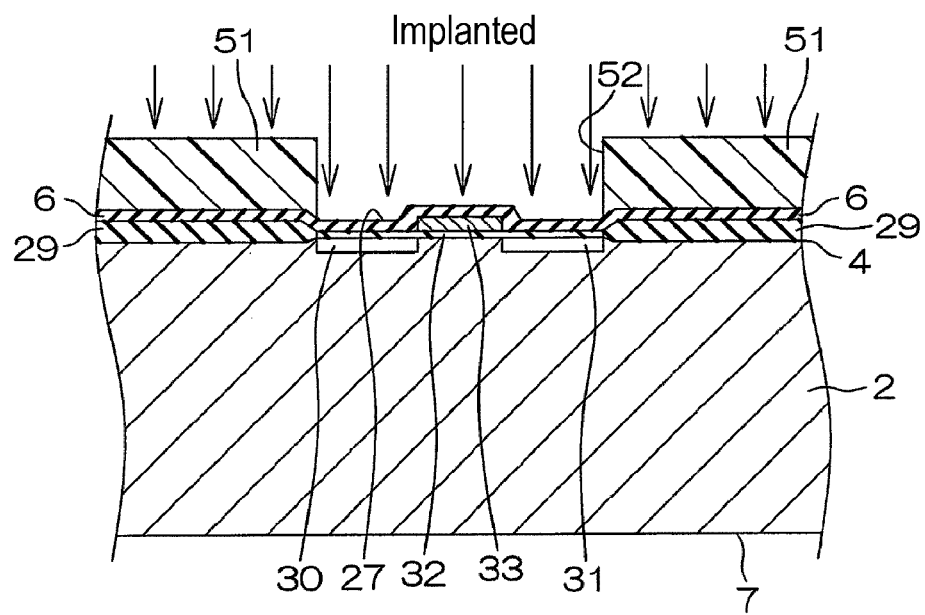
FIG. 18B shows the cross section taken in the same position as in FIG. 3B at the same time point in time as the step shown in FIG. 18A.

Next, a polysilicon film is deposited on the gate oxide film 32 within the integrated circuit region 27. The polysilicon film is patterned by photolithography, thereby forming a gate electrode 33 on the gate oxide film 32 as shown in FIG. 17. Next, as shown in FIG. 18B, a resist pattern 51 is formed on the front surface of the silicon substrate 2. The resist pattern 51 has one opening 52 corresponding to the integrated circuit region 27. Impurities (e.g., arsenic (As) ions) are implanted into the surface layer portion of the silicon substrate 2 using the resist pattern 51 and the gate electrode 33 as masks. In the surface layer portion of the silicon substrate 2 within the integrated circuit region 27, a source 30 and a drain 31 are formed in the regions opposing each other across the gate electrode 33.

After the resist pattern 51 is removed, an insulating layer 6 covering the front surface of the silicon substrate 2 is formed by a CVD method. More specifically, the insulating layer 6 is formed to cover the covering layer 5 shown in FIG. 18A and the LOCOS layer 29 and the gate oxide film 32 shown in FIG. 18B. Next, as shown in FIG. 3A, an opening (or a contact hole) 53 is formed by photolithography to penetrate through the insulating layer 6 and the covering layer 5. This contact hole 53 is formed in such a position as to partially expose the diaphragm 9 therethrough. Another contact hole 53 is formed to penetrate through the insulating layer 6 and the covering layer 5. This contact hole 53 is formed in such a position as to partially expose the remaining portion 11 therethrough. As shown in FIG. 3B, contact holes 54 for the source 30 and the drain 31 are formed. The contact holes 54 are formed to penetrate through the insulating layer 6 and the gate oxide film 32 and to partially expose the source 30 and the drain 31 therethrough. Although not shown in the drawings, a contact hole connected to the gate electrode 33 is formed in the same step to penetrate through the insulating layer 6.

Next, aluminum is deposited on the insulating layer 6 by a sputtering method to thereby form an aluminum deposition film 55. The aluminum deposition film 55 is connected through the contact holes 53 and 54 to the diaphragm 9, the remaining portion 11, the source 30, the drain 31 and the gate electrode 33. Then, a resist pattern (not shown) is formed on the aluminum deposition film 55 by photolithography. Thereafter, the aluminum deposition film 55 is selectively removed by plasma etching in which the resist pattern is used as a mask. Thus, a first metal wiring line 16, a second metal wiring line 17, a first metal terminal 18 and a second metal terminal 19 are formed at the same time (see FIG. 2). At this time, the first metal wiring line 16 is connected to the diaphragm 9 via the corresponding contact hole 53. The second metal wiring line 17 is connected to the remaining portion 11 via the corresponding contact hole 53. Simultaneously, metal wiring lines (e.g., a source-side metal wiring line 35 and a drain-side metal wiring line 36) connected to the source 30, the drain 31 and the gate electrode 33 of the integrated circuit portion 28 and metal terminals (not shown) are also formed. Thereafter, the resist pattern is peeled off.

Next, a passivation film 20 is formed on the insulating layer 6 by a CVD method. Thereafter, as shown in FIG. 3A, openings 21 through which to expose the first metal terminal 18 and the second metal terminal 19 (including the metal terminals of the integrated circuit portion 28 not shown) as pads are formed in the passivation film 20 by photolithography and etching. In FIG. 3A, there is illustrated only the opening 21 through which to expose the second metal terminal 19.

In addition, an opening 56 through which to expose the region of the insulating layer 6 surrounding all the through-holes 12 (namely, the substantially entire region of the diaphragm 9) is formed in the passivation film 20 by photolithography and etching. When seen in a plane view, the opening 56 has, e.g., a shape similar to that of the reference pressure compartment 8. In the manner stated above, the pressure sensor 1 shown in FIGS. 2 and 3 is obtained. The reason for forming the opening 56 in the passivation film 20 and exposing the diaphragm 9 from the opening 56 is to make the diaphragm 9 highly flexible. If the passivation film 20 exists on the diaphragm 9, the diaphragm 9 becomes less flexible, consequently reducing the sensitivity of the pressure sensor 1.

With the present embodiment, if the substrate material existing below the through-holes 12 is etched in the etching step (shown in FIGS. 10A through 12B) by introducing an etching agent into the through-holes 12, the reference pressure compartment 8 is formed in the silicon substrate 2 below the through-holes 12. In the silicon substrate 2, the through-holes 12 are arranged in the predetermined region, which is surrounded by the isolation insulating layer 10 formed within the ring-shaped trench 42. On the other hand, the diaphragm 9 is formed above the reference pressure compartment 8 (see FIGS. 12A and 12B). At this time, the isolation insulating layer 10 surrounds the diaphragm 9 so that the diaphragm 9 can be defined by the isolation insulating layer 10 in a direction orthogonal to the thickness direction of the silicon substrate 2. It is therefore possible to accurately form the diaphragm 9 with a desired dimension. This makes it possible to easily manufacture the pressure sensor 1 with increased sensitivity and reduced variation in sensitivity. Since the isolation insulating layer 10 isolates the diaphragm 9 from the remaining portion 11 of the silicon substrate 2, the diaphragm 9 and the remaining portion 11 are insulated from each other. Accordingly, a capacitor structure can be formed by the diaphragm 9 and the fixed electrode 11A of the remaining portion 11 defining the bottom surface of the reference pressure compartment 8.

With the manufacturing method described above, the reference pressure compartment 8 and the diaphragm 9 can be formed using a reduced number of steps using only one silicon substrate 2 without the step of bonding two silicon substrates 2 together. It is therefore possible to easily manufacture a cheap and small (thin) pressure sensor 1. In particular, if the pressure sensor 1 is formed by bonding two silicon substrates 2 together, a leak is likely to occur in the bonding portion of the two silicon substrates 2. In contrast, in the present embodiment, the diaphragm 9 is a movable component that forms a portion of the silicon substrate 2. Thanks to this feature, the reference pressure compartment 8 can be kept as a leak-free sealed space. This makes it possible to provide a highly reliable pressure sensor 1.

Figure 13B:
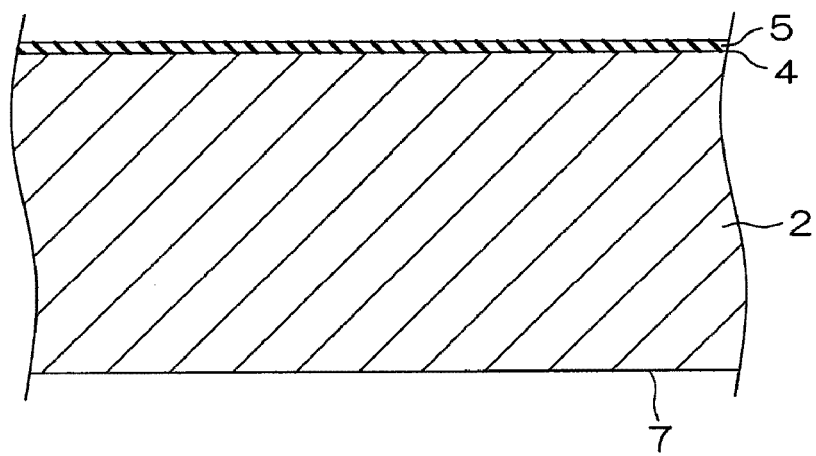
FIG. 13B shows the cross section taken in the same position as in FIG. 3B at the same time point as the step shown in FIG. 13A.

By arranging the fillers 14 within the through-holes 12 as shown in FIGS. 13A and 13B, it is possible to hermetically seal the reference pressure compartment 8 positioned below the through-holes 12. Using the pressure within the reference pressure compartment 8 as a reference pressure, the pressure sensor 1 finally manufactured as shown in FIG. 3A can detect the pressure acting on the diaphragm 9 as a relative pressure with respect to the reference pressure. The isolation insulating layer 10 filled in the ring-shaped trench 42 extends into the silicon substrate 2 to a position shallower than the bottom surface of the reference pressure compartment 8 and defines a region narrower than the reference pressure compartment 8. In other words, the reference pressure compartment 8 is formed over a region broader than the region defined by the isolation insulating layer 10. As a result, the outer peripheral film portion 22 is formed in the peripheral region outside the isolation insulating layer 10 (namely, the outer region of the isolation insulating layer 10 is opposite the diaphragm 9). Thus, there is formed a movable film 23 including the diaphragm 9, the isolation insulating layer 10 and the outer peripheral film portion 22. The movable film 23 is larger than the diaphragm 9 and is provided with the diaphragm 9 in the central region thereof. Accordingly, the displacement of the diaphragm 9 defined by the isolation insulating layer 10 becomes greater. In proportion thereto, the responsiveness of the diaphragm 9 to a minute pressure change can be improved. It is therefore possible to enhance the sensitivity of the pressure sensor 1.

In this regard, if the isolation insulating layer 10 is formed in a position closer to the center of the diaphragm 9 so that some of the through-holes 12 can be positioned outside the isolation insulating layer 10, the diaphragm 9 becomes more flexible. This makes it possible to further enhance the sensitivity of the pressure sensor 1. By connecting the first metal wiring line 16 to the diaphragm 9 and connecting the second metal wiring line 17 to the remaining portion 11 of the silicon substrate 2, it is possible to easily manufacture a capacitance type pressure sensor 1 of simple configuration in which the fixed electrode 11A of the remaining portion 11 and the diaphragm 9 are used as electrodes. In this configuration, the silicon substrate 2 is insulated from the diaphragm 9 by the isolation insulating layer 10.

Since the protective thin film 13 is formed on the sidewalls of the through-holes 12 in advance, it is possible to prevent the etching agent introduced into the through-holes 12 in the etching step from etching the sidewalls of the through-holes 12 (the portions to become the diaphragm 9) (see FIG. 12A). In addition, if the integrated circuit portion 28 is formed in the integrated circuit region 27 of the silicon substrate 2 other than the region in which the reference pressure compartment 8 is formed, it is possible to form the pressure sensor 1 and the integrated circuit portion 28 in one silicon substrate 2 (more precisely, in the same rectangular region 3) (see FIGS. 2 and 3B).

In particular, the diaphragm 9 is formed of a portion of the silicon substrate 2. Thus, the pressure sensor 1 can be formed while keeping the front surface 4 of the silicon substrate 2 in a flat state. Accordingly, it is possible to form the integrated circuit portion 28 collectively in the region other than the diaphragm 9 on the flat front surface 4 of each of the rectangular regions 3. This makes it possible to configure the body portion of the pressure sensor 1 (the portion in which the diaphragm 9 is formed) and the integrated circuit portion 28 (LSI) into a single chip (see FIG. 2).

In the embodiment described above, there is illustrated an example in which the diaphragm 9 is of a thin disc-like shape having a plurality of through-holes 12. However, the sensitivity of the pressure sensor 1 can be changed depending on not only the dimension of the reference pressure compartment 8 but also the area, thickness and shape of the diaphragm 9. For example, the sensitivity of the pressure sensor 1 is higher when the shape of the diaphragm 9 is of a quadrangular shape (in which case the four corners may be either right-angled or rounded) than when the shape of the diaphragm 9 is of a circular shape. The reason is that, when the diaphragm 9 has a quadrangular shape, the area of the diaphragm 9 becomes larger by the areas of the four corners than when the diaphragm 9 has a circular shape. As the area of the diaphragm 9 grows larger, the diaphragm 9 becomes more flexible. In proportion thereto, the gap between the diaphragm 9 and the fixed electrode 11A (namely, the depth of the reference pressure compartment 8) becomes easy to change, which leads to an increase in the sensitivity of the pressure sensor 1.

However, if the diaphragm 9 has a quadrangular shape, it is likely that local forces are applied to the four corners. Thus, the diaphragm 9 is easily subjected to breakage. In contrast, if the diaphragm 9 has a circular shape, the breakage is less likely to occur in the diaphragm 9. In view of this, the shape of the diaphragm 9 is appropriately selected depending which of the sensitivity and the durability is emphasized. If the diaphragm 9 has a quadrangular shape with four rounded corners, it is possible to satisfy the requirements of both sensitivity and durability. Needless to say, the diaphragm 9 may have a polygonal shape other than the quadrangular shape.

In the embodiment described above, there is illustrated an example in which the integrated circuit portion 28 is formed in the silicon substrate 2 having the pressure sensor 1. Alternatively, the integrated circuit portion 28 may not be formed in the silicon substrate 2. While one embodiment of the present invention has been described above, many different changes in design may be made without departing from the scope of the subject matter defined in the claims.

While one embodiment has been described, this embodiment has been presented by way of example only, and is not intended to limit the scope of the disclosures. Indeed, the novel pressure sensor and method described herein may be embodied in a variety of other forms; furthermore, various omissions, substitutions and changes in the form of the embodiment described herein may be made without departing from the spirit of the disclosure. The accompanying claims and their equivalents are intended to cover such forms or modifications as would fall within the scope and spirit of the disclosure.

What is claimed is:

1. A capacitance type pressure sensor, comprising:
   a semiconductor substrate having a reference pressure compartment formed therein;
   a diaphragm formed of a portion of the semiconductor substrate and formed in a surface layer portion of the semiconductor substrate to define the reference pressure compartment, the diaphragm having a through-hole communicating with the reference pressure compartment;
   a filler arranged within the through-hole; and
   an isolation insulating layer surrounding the diaphragm to isolate the diaphragm from the remaining portion of the semiconductor substrate.

2. The sensor of claim 1, further comprising:
   a first wiring line connected to the diaphragm; and
   a second wiring line connected to a portion of the semiconductor substrate insulated from the diaphragm by the isolation insulating layer.

3. The sensor of claim 1, wherein the isolation insulating layer extends into the semiconductor substrate to a position shallower than a bottom surface of the reference pressure compartment and defines a region narrower than the reference pressure compartment.

4. The sensor of claim 1, further comprising:
a sidewall insulating layer formed into a tubular shape to cover a sidewall of the through-hole, the sidewall insulating layer protruding from the diaphragm into the reference pressure compartment.

5. The sensor of claim 1, further comprising:
an integrated circuit portion having integrated circuit devices formed in the semiconductor substrate.

6. A method for manufacturing a capacitance type pressure sensor, the method comprising:
forming a ring-shaped trench in a semiconductor substrate to surround a region on a surface of the semiconductor substrate;
filling an isolation insulating layer into the ring-shaped trench;
forming a hole in the region on the surface of the semiconductor substrate;
introducing an etching agent into the hole and etching a substrate material existing below the hole to thereby form a reference pressure compartment below the hole and a diaphragm above the reference pressure compartment; and
arranging fillers within the hole.

7. The method of claim 6, wherein forming a ring-shaped trench comprises forming the ring shaped trench at a depth shallower than a portion of the semiconductor substrate which is to become a bottom surface of the reference pressure compartment, wherein introducing an etching agent into the hole includes isotropically etching the substrate material existing below the hole such that the reference pressure compartment is formed below the ring-shaped trench to extend over a region broader than the ring-shaped trench.

8. The method of claim 6, further comprising:
connecting a first wiring line to the diaphragm; and
connecting a second wiring line to a portion of the semiconductor substrate insulated from the diaphragm by the isolation insulating layer.

9. The method of claim 6, wherein introducing an etching agent into the hole includes forming a sidewall insulating layer on a sidewall of the hole and isotropically etching the substrate material by introducing the etching agent into the hole.

10. The method of claim 6, further comprising:
forming integrated circuit devices in a region of the semiconductor substrate other than a region in which the reference pressure compartment is formed.

* * * * *